(12) United States Patent
Zhang et al.

(10) Patent No.: US 12,742,947 B2
(45) Date of Patent: Sep. 22, 2026

(54) OPTICAL IMAGING SYSTEM

(71) Applicant: Zhejiang Sunny Optics Co., Ltd, Yuyao City (CN)

(72) Inventors: Rui Zhang, Yuyao City (CN); Jiadong Zhu, Yuyao City (CN); Fujian Dai, Yuyao City (CN); Liefeng Zhao, Yuyao City (CN)

(73) Assignee: Zhejiang Sunny Optics Co., Ltd, Yuyao City (CN)

(*) Notice: Subject to any disclaimer, the term of this patent is extended or adjusted under 35 U.S.C. 154(b) by 632 days.

(21) Appl. No.: 18/303,811

(22) Filed: Apr. 20, 2023

(65) Prior Publication Data

US 2024/0151943 A1 May 9, 2024

(30) Foreign Application Priority Data

Nov. 3, 2022 (CN) ......................... 202211369782.7

(51) Int. Cl.
*G02B 13/00* (2006.01)
*G02B 9/62* (2006.01)

(52) U.S. Cl.
CPC ........... *G02B 13/0045* (2013.01); *G02B 9/62* (2013.01)

(58) Field of Classification Search
CPC .............................. G02B 13/0045; G02B 9/62
See application file for complete search history.

(56) References Cited

U.S. PATENT DOCUMENTS

2019/0369368 A1* 12/2019 Jung .................. G02B 13/0045

* cited by examiner

*Primary Examiner* — Wen Huang
(74) *Attorney, Agent, or Firm* — Sughrue Mion, PLLC

(57) ABSTRACT

The present disclosure discloses an optical imaging system. The optical imaging system comprises a lens barrel, and a lens group and at least one spacing element accommodated in the lens barrel. The lens group comprises a first lens, a second lens, a third lens, a fourth lens, a fifth lens and a sixth lens that are arranged in sequence along an optical axis from an object side to an image side. Here, the sixth lens has a negative refractive power. The at least one spacing element comprises a fifth spacing element that is located between the fifth lens and the sixth lens and is in contact with an image-side surface of the fifth lens.

11 Claims, 13 Drawing Sheets

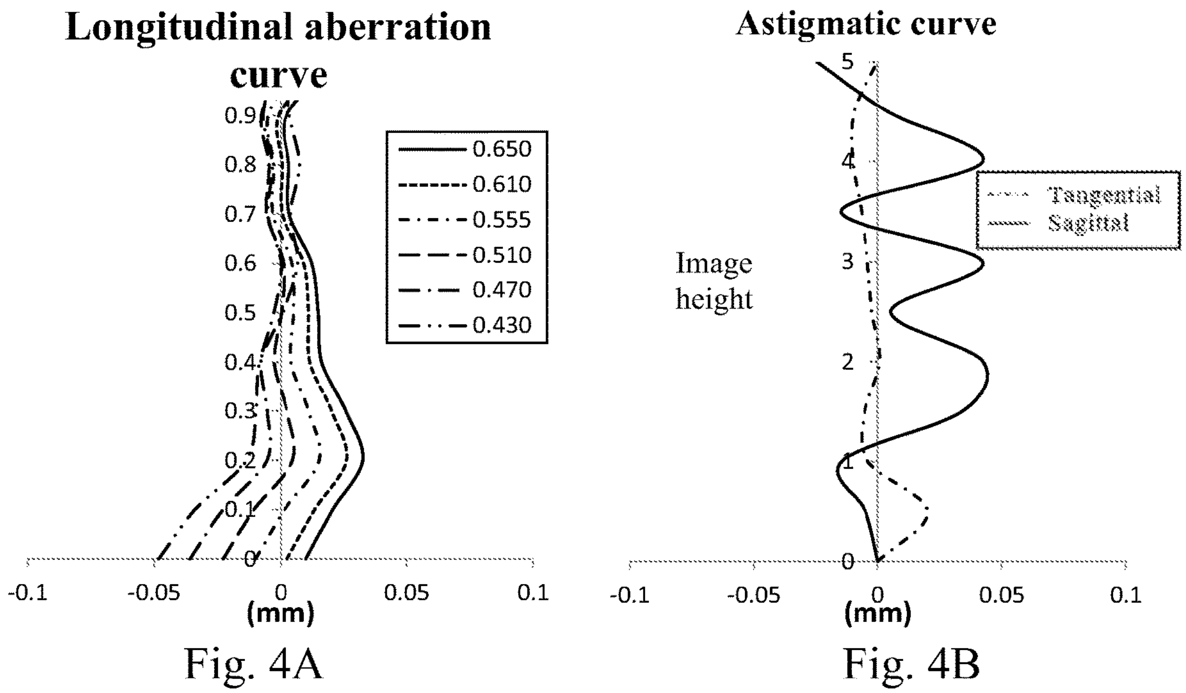
Fig. 4A
Fig. 4B
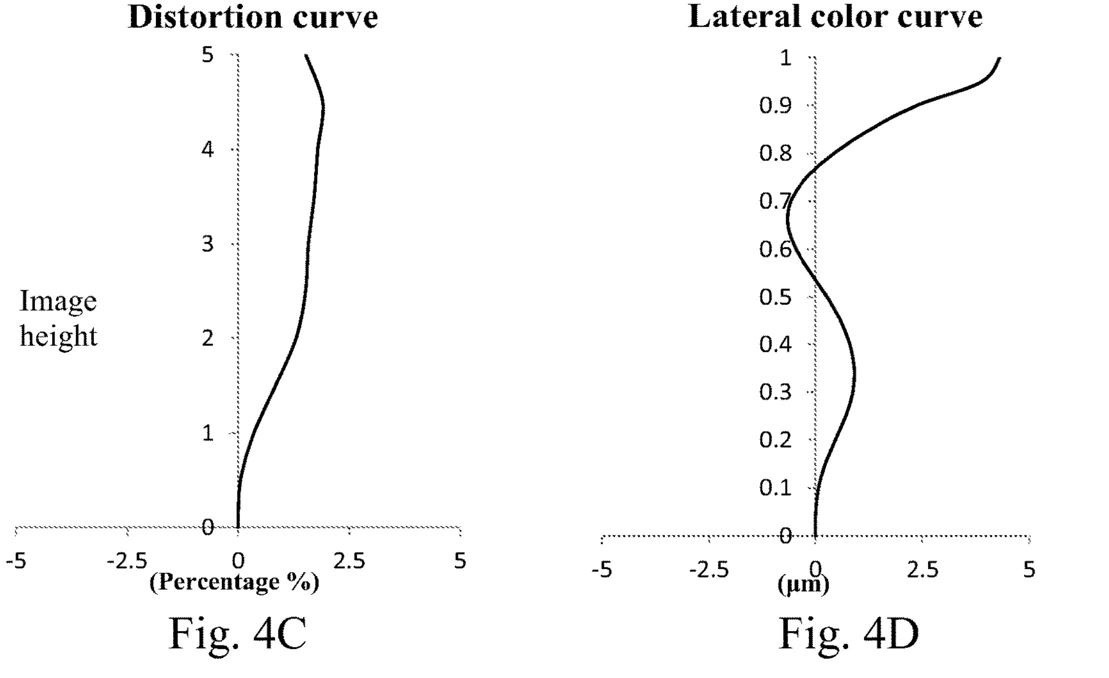
Fig. 4C
Fig. 4D

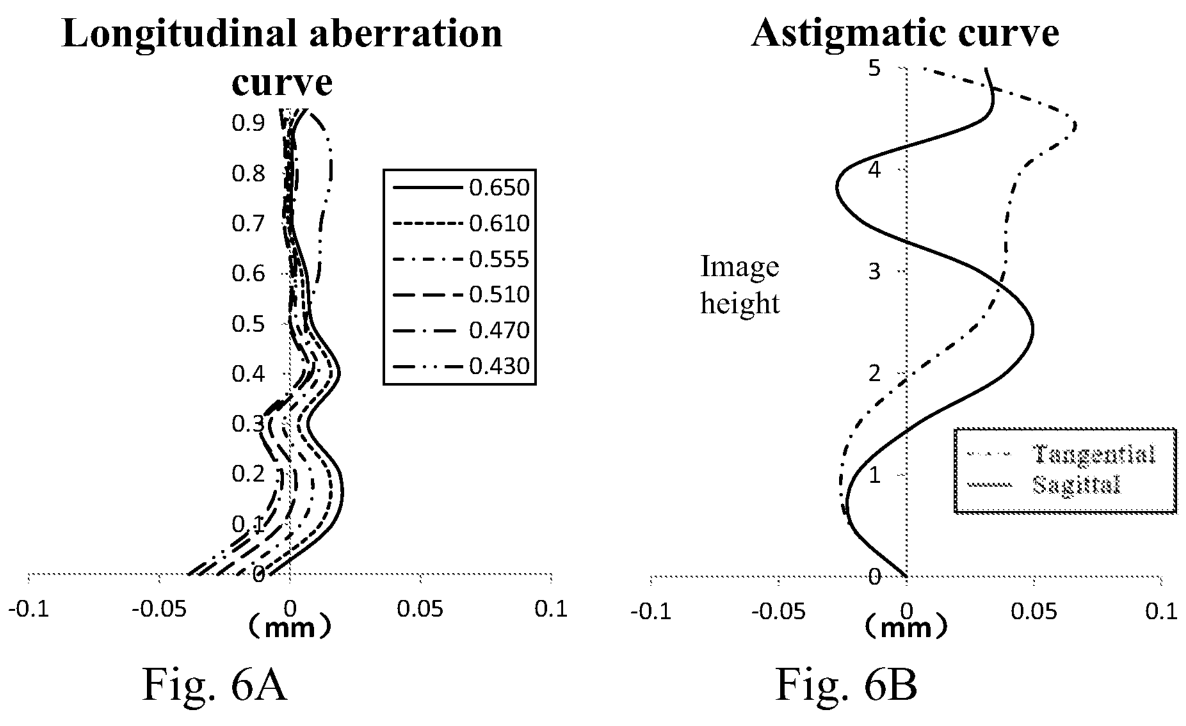
Fig. 6A
Fig. 6B
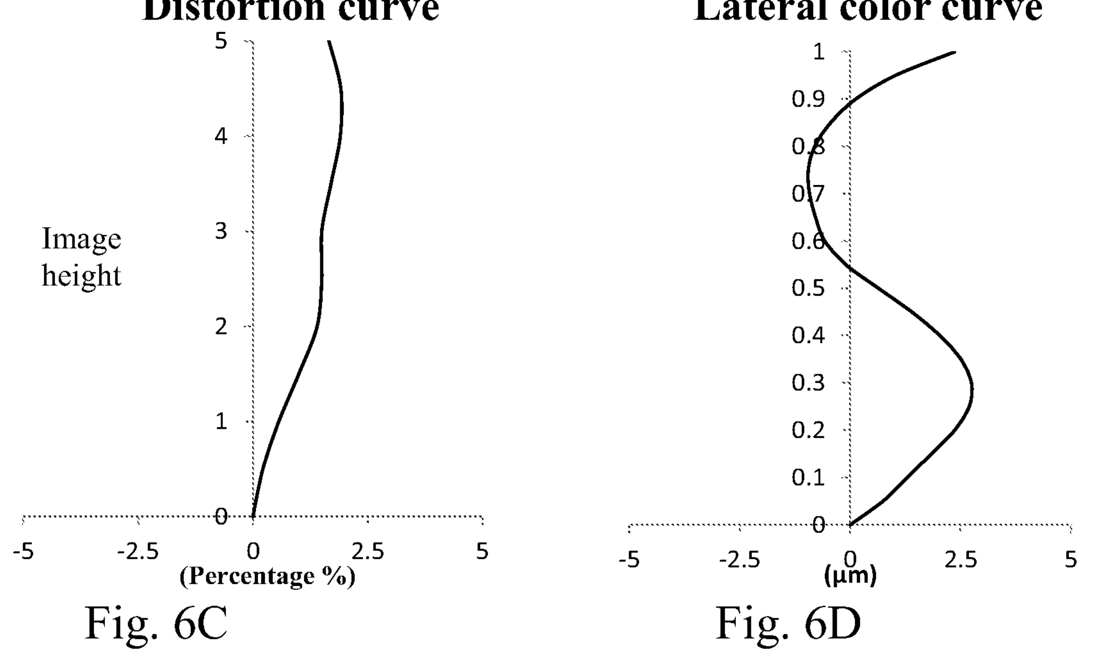
Fig. 6C
Fig. 6D

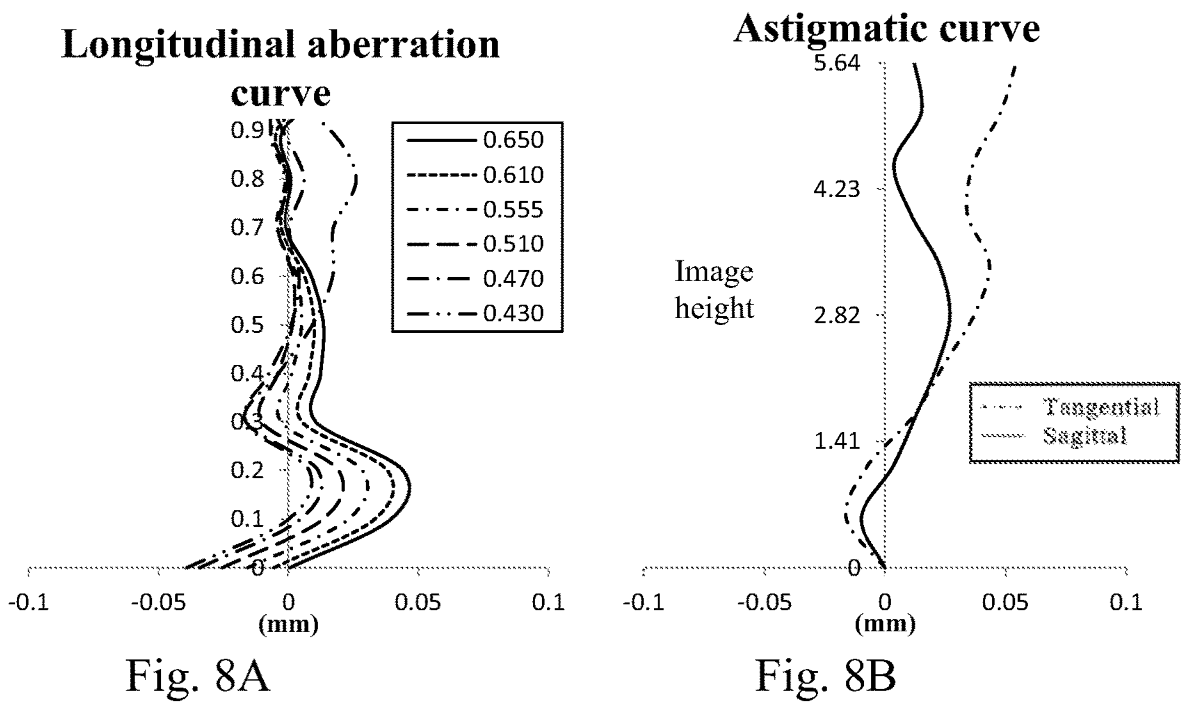
Fig. 8A
Fig. 8B
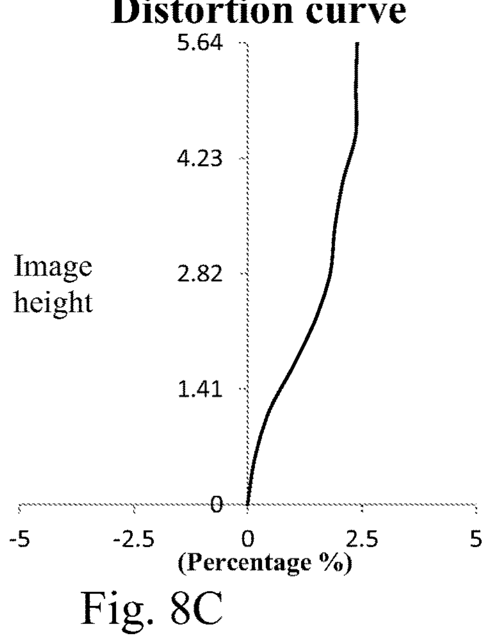
Fig. 8C
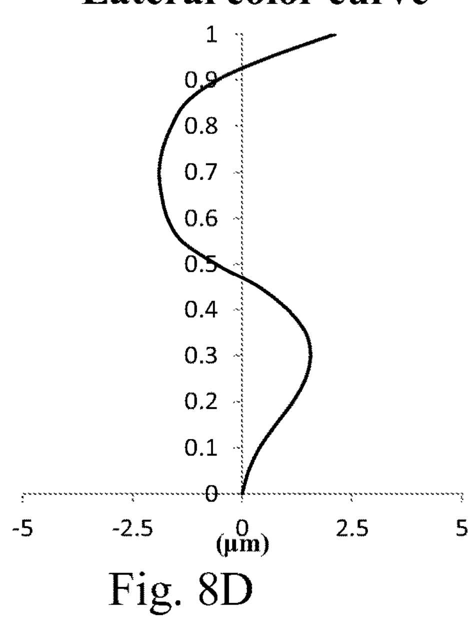
Fig. 8D

OPTICAL IMAGING SYSTEM

CROSS-REFERENCE TO RELATED APPLICATIONS

This application claims the priority from Chinese Patent Application No. 202211369782.7, filed in the National Intellectual Property Administration (CNIPA) on Nov. 3, 2022, the content of which is hereby incorporated by reference in its entirety.

TECHNICAL FIELD

The present disclosure relates to the field of optical element, and specifically to an optical imaging system.

BACKGROUND

With the development of science and technology, people have higher and higher requirements on the photo effects of mobile phones in different scenarios. With the increasing number of people now using mobile phones, in order to ensure the clarity and quality of imaging, it is required not only to improve the avoidance of stray light, but also to improve the assembling stability of lens assemblies. Taking the structure of an ultra-thin lens assembly having six lenses and a large image plane as an example, there is usually a large segment difference between, for example, a fifth lens and a sixth lens at the rear end of the lens assembly. A too large segment difference gives rise to poor assembling stability easily, resulting in a problem of partially imaging, which seriously affects the yield of the lens assembly. In addition, if the stray light generated between the lenses cannot be effectively blocked, it will also result in negative impacts on the imaging quality of the lens assembly. Problems like these are hindering the development of high-standard and high-quality lens assemblies. Therefore, how to effectively and reasonably disposing, for example, spacer rings/spacers from the perspective of structural design to effectively improve the assembling stability and effectively avoid the stray light so as to improve the stability of the lens assembly and the imaging quality of the lens assembly to enable the lens assembly to satisfy the current high demands has become one of the technical problems those skilled in the art are committed to solving.

SUMMARY

The present disclosure provides an optical imaging system, and the optical imaging system comprises: a lens barrel, and a lens group and at least one spacing element accommodated in the lens barrel, wherein the lens group comprises a first lens, a second lens, a third lens, a fourth lens, a fifth lens and a sixth lens that are arranged in sequence along an optical axis from an object side to an image side, wherein the sixth lens has a negative refractive power; the at least one spacing element comprises a fifth spacing element that is located between the fifth lens and the sixth lens and is in contact with an image-side surface of the fifth lens; and the optical imaging system satisfies: $1.0<CP5/T45+|f6/d5m|<2.5$, wherein CP5 is a maximal thickness of the fifth spacing element along a direction parallel to the optical axis, T45 is an air spacing between the fourth lens and the fifth lens on the optical axis, f6 is an effective focal length of the sixth lens, and d5m is an inner diameter of an image-side surface of the fifth spacing element.

In an implementation, the at least one spacing element further comprises a first spacing element that is located between the first lens and the second lens and is in contact with an image-side surface of the first lens, and an outer diameter D1m of an image-side surface of the first spacing element, an inner diameter d1m of the image-side surface of the first spacing element, an effective focal length f1 of the first lens and a radius of curvature R1 of an object-side surface of the first lens satisfy: $1.5<f1/D1m+R1/d1m<3.0$.

In an implementation, the at least one spacing element further comprises a first spacing element that is located between the first lens and the second lens and is in contact with an image-side surface of the first lens, and a distance EP01 from an object-side end surface of the lens barrel to an object-side surface of the first spacing element along the direction parallel to the optical axis, a center thickness CT1 of the first lens on the optical axis, an effective focal length f1 of the first lens and a radius of curvature R2 of the image-side surface of the first lens satisfy: $12.5<f1/EP01+R2/CT1<15.0$.

In an implementation, the at least one spacing element further comprises a first spacing element that is located between the first lens and the second lens and is in contact with an image-side surface of the first lens, and an air spacing T12 between the first lens and the second lens on the optical axis, a maximal thickness CP1 of the first spacing element along the direction parallel to the optical axis, a radius of curvature R2 of the image-side surface of the first lens and an inner diameter d1s of an object-side surface of the first spacing element satisfy: $3.5<T12/CP1+R2/d1s<12.5$.

In an implementation, the at least one spacing element further comprises a first spacing element that is located between the first lens and the second lens and is in contact with an image-side surface of the first lens, and a second spacing element that is located between the second lens and the third lens and is in contact with an image-side surface of the second lens, and a spacing distance EP12 between the first spacing element and the second spacing element along the direction parallel to the optical axis, a center thickness CT2 of the second lens on the optical axis, a radius of curvature R3 of an object-side surface of the second lens and a radius of curvature R4 of the image-side surface of the second lens satisfy: $1.5<EP12\times R3/(CT2\times R4)<3.5$.

In an implementation, the at least one spacing element further comprises a second spacing element that is located between the second lens and the third lens and is in contact with an image-side surface of the second lens, and an air spacing T23 between the second lens and the third lens on the optical axis, a maximal thickness CP2 of the second spacing element along the direction parallel to the optical axis, a radius of curvature R5 of an object-side surface of the third lens and an inner diameter d2s of an object-side surface of the second spacing element satisfy: $25.0<|T23/CP2+R5/d2s|<41.0$.

In an implementation, the at least one spacing element further comprises a second spacing element that is located between the second lens and the third lens and is in contact with an image-side surface of the second lens, a third spacing element that is located between the third lens and the fourth lens and is in contact with an image-side surface of the third lens, and a fourth spacing element that is located between the fourth lens and the fifth lens and is in contact with an image-side surface of the fourth lens, and a spacing distance EP34 between the third spacing element and the fourth spacing element along the direction parallel to the optical axis, a spacing distance EP23 between the second spacing element and the third spacing element along the direction parallel to the optical axis, an effective focal length f3 of the third lens and an effective focal length f4 of the fourth lens satisfy: $0.4<|EP34\times f4/(EP23\times f3)|<1.5$.

In an implementation, the at least one spacing element further comprises a fourth spacing element that is located between the fourth lens and the fifth lens and is in contact with an image-side surface of the fourth lens, and a center thickness CT4 of the fourth lens on the optical axis, a spacing distance EP45 between the fourth spacing element and the fifth spacing element along the direction parallel to the optical axis, an effective focal length f5 of the fifth lens and an inner diameter d4m of an image-side surface of the fourth spacing element satisfy: $1.5<CT4/EP45+f5/d4m<2.5$.

In an implementation, a radius of curvature R11 of an object-side surface of the sixth lens, a radius of curvature R12 of an image-side surface of the sixth lens, an outer diameter D5m of the image-side surface of the fifth spacing element and the inner diameter d5m of the image-side surface of the fifth spacing element satisfy: $2.0<|R11\times D5m|/(R12\times d5m)<6.5$.

In an implementation, the at least one spacing element further comprises a second spacing element that is located between the second lens and the third lens and is in contact with an image-side surface of the second lens, and a third spacing element that is located between the third lens and the fourth lens and is in contact with an image-side surface of the third lens, and a spacing distance EP23 between the second spacing element and the third spacing element along the direction parallel to the optical axis, a center thickness CT3 of the third lens on the optical axis, an abbe number V3 of the third lens and an abbe number V2 of the second lens satisfy: $2.0<EP23/CT3+V3/V2<4.5$.

In an implementation, a relative F-number Fno of the optical imaging system, a maximal height of the lens barrel along a direction of the optical axis and an effective focal length f of the optical imaging system satisfy: $1.5<Fno\times(L/f)<2.0$.

In an implementation, the at least one spacing element further comprises a first spacing element that is located between the first lens and the second lens and is in contact with an image-side surface of the first lens, and L is a maximal height of the lens barrel along a direction of the optical axis, half of a maximal field-of-view Semi-FOV of the optical imaging system, an effective focal length f of the optical imaging system, an outer diameter D5m of the image-side surface of the fifth spacing element, and an outer diameter D1m of an image-side surface of the first spacing element satisfy: $2.5<L/(\tan(\text{Semi-FOV})\times f)+D5m/D1m<3.5$.

The optical imaging system provided in the present disclosure comprises an imaging lens group, at least one spacing element and a lens barrel. Here, the imaging lens group adopts a six-lens structure, and each lens is respectively in contact with the inner wall of the lens barrel. A fifth spacer in contact with the image-side surface of the fifth lens is disposed between the fifth lens and the sixth lens. The sixth lens is disposed to have a negative refractive power. By reasonably controlling the maximal thickness of the fifth spacing element and the inner diameter of the image-side surface of the fifth spacing element, and at the same time, by reasonably controlling the air spacing between the fourth lens and the fifth lens on the optical axis, the effective focal length of the sixth lens and other parameters, and controlling these parameters to satisfy $1.0<CP5/T45+|f6/d5m|<2.5$, the curvature of the sixth lens can be ensured to avoid the difficulty in molding and processing due to the excessive curvature of the sixth lens. Moreover, the segment difference between the fifth lens and the sixth lens can be controlled to avoid the poor assembling stability due to the too large segment difference between the fifth lens and the sixth lens, which is conducive to improving the assembling yield, enhancing the reliability of the lens assembly, increasing the support force for the lens at the rear end, and reducing the tilting and dropping of the lens in the reliability test, thereby improving the yield of the lens assembly. Meanwhile, the stray light generated when the light passes through the sixth lens can be effectively avoided, which is conducive to improving the imaging quality of the lens assembly.

BRIEF DESCRIPTION OF THE DRAWINGS

In combination with the accompanying drawings, other features, objectives and advantages of the present disclosure will become more apparent through the following detailed description for non-limiting embodiments. In the accompanying drawings:

FIGS. 4A-4D respectively illustrate a longitudinal aberration curve, an astigmatic curve, a distortion curve and a lateral color curve of the optical imaging system in Embodiment 1;

FIGS. 6A-6D respectively illustrate a longitudinal aberration curve, an astigmatic curve, a distortion curve and a lateral color curve of the optical imaging system in Embodiment 2;

FIGS. 8A-8D respectively illustrate a longitudinal aberration curve, an astigmatic curve, a distortion curve and a lateral color curve of the optical imaging system in Embodiment 3.

DETAILED DESCRIPTION OF EMBODIMENTS

Figure 1:
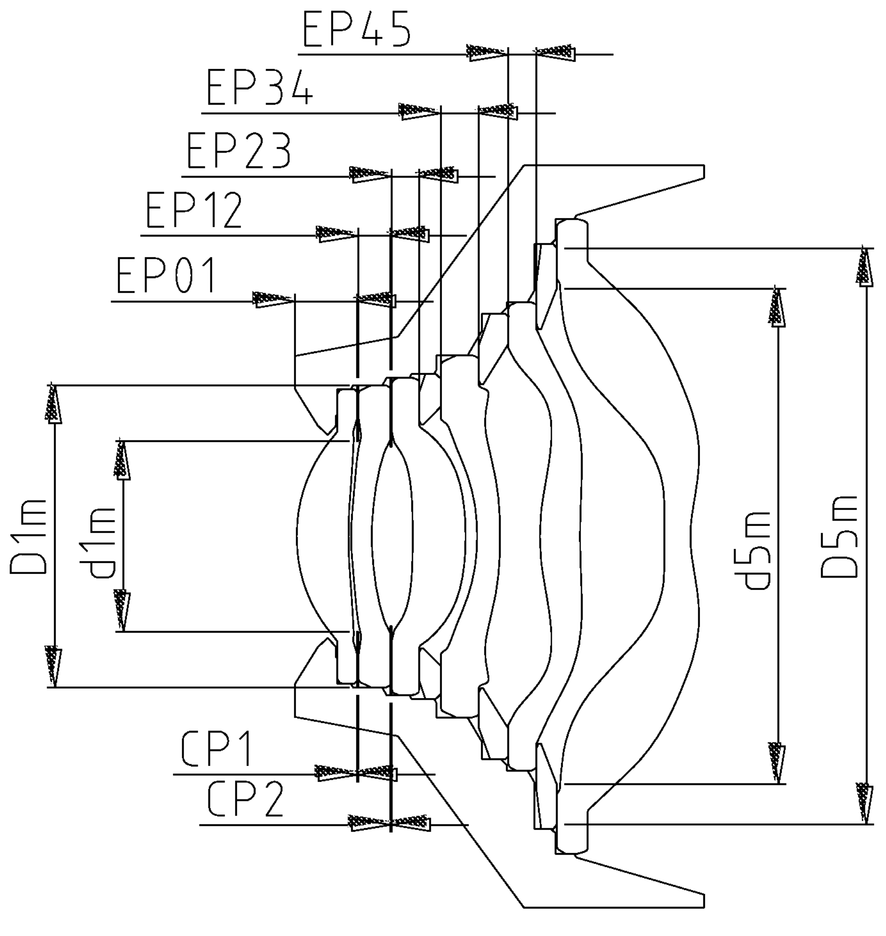
FIG. 1 is a schematic diagram of a structure and some parameters of an optical imaging system according to exemplary implementations of the present disclosure.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of explanation. Specifically, the shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a paraxial area refers to an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least at the paraxial area. The determination for the surface shape at the paraxial area may be according to the method commonly used in the art, for example, whether the surface is concave or convex is determined according to whether the R value (R refers to a radius of curvature at the paraxial area) is positive or negative. Herein, a surface of each lens that is closest to a photographed object is referred to as the object-side surface of the lens, and a surface of the each lens that is closest to an image plane is referred to as the image-side surface of the lens. For the object-side surface, it is determined that the object-side surface is a convex surface when the R value is positive, and it is determined that the object-side surface is a concave surface when the R value is negative. For the image-side surface, it is determined that the image-side surface is a concave surface when the R value is positive, and it is determined that the image-side surface is a convex surface when the R value is negative.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, represents "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The following embodiments only express several implementations of the present disclosure, and the description thereof is specific and detailed, but should not be construed as a limitation to the patent scope of the present disclosure. It should be noted that those skilled in the art can make several variations and improvements without departing from the concept of the present disclosure, and these variations and improvements all fall into the scope of protection of the present disclosure. The present disclosure will be described below in detail with reference to the accompanying drawings and in combination with the embodiments.

Features, principles and other aspects of the present disclosure are described below in detail.

An optical imaging system according to exemplary implementations of the present disclosure may include a lens barrel, and a lens group and at least one spacing element accommodated in the lens barrel. The lens group may be a six-lens lens group, including a first lens, a second lens, a third lens, a fourth lens, a fifth lens and a sixth lens that are arranged in sequence along an optical axis from an object side to an image side. The first to sixth lenses in the lens group may be respectively in contact with an inner wall of the lens barrel. The at least one spacing element may include a fifth spacing element that is disposed between the fifth lens and the sixth lens and is in contact with an image-side surface of the fifth lens.

In the exemplary implementations, the at least one spacing element may include a plurality of spacing elements that are respectively disposed between adjacent lenses, and the spacing elements may be respectively in contact with the lenses. For example, the at least one spacing element may include a first spacing element that is disposed between the first lens and the second lens and is in contact with an image-side surface of the first lens, a second spacing element that is disposed between the second lens and the third lens and is in contact with an image-side surface of the second lens, a third spacing element that is disposed between the third lens and the fourth lens and is in contact with an image-side surface of the third lens, or a fourth spacing element that is disposed between the fourth lens and the fifth lens and is in contact with an image-side surface of the fourth lens.

In the exemplary implementations, the first lens may have a positive refractive power or negative refractive power; the second lens may have a positive refractive power or negative refractive power; the third lens may have a positive refractive power or negative refractive power; the fourth lens may have a positive refractive power or negative refractive power; the fifth lens may have a positive refractive power or negative refractive power; and the sixth lens may have a negative refractive power.

In the exemplary implementations, the optical imaging system according to the present disclosure may satisfy the conditional expression $1.0<CP5/T45+|f6/d5m|<2.5$. Here, CP5 is a maximal thickness of the fifth spacing element along a direction parallel to the optical axis, T45 is an air spacing between the fourth lens and the fifth lens on the optical axis, f6 is an effective focal length of the sixth lens, and d5m is an inner diameter of an image-side surface of the fifth spacing element. By reasonably controlling the maximal thickness of the fifth spacing element and the air spacing between the fourth lens and the fifth lens on the optical axis, and at the same time, by reasonably controlling the effective focal length of the sixth lens and the inner diameter of the image-side surface of the fifth spacing element, the curvature of the sixth lens can be ensured, to avoid the difficulty in molding and processing due to the excessive curvature of the sixth lens. Moreover, the segment difference between the fifth lens and the sixth lens can be controlled to avoid the poor assembling stability and the impact on the yield of the lens assembly due to the too large segment difference between the fifth lens and the sixth lens.

Figure 2:
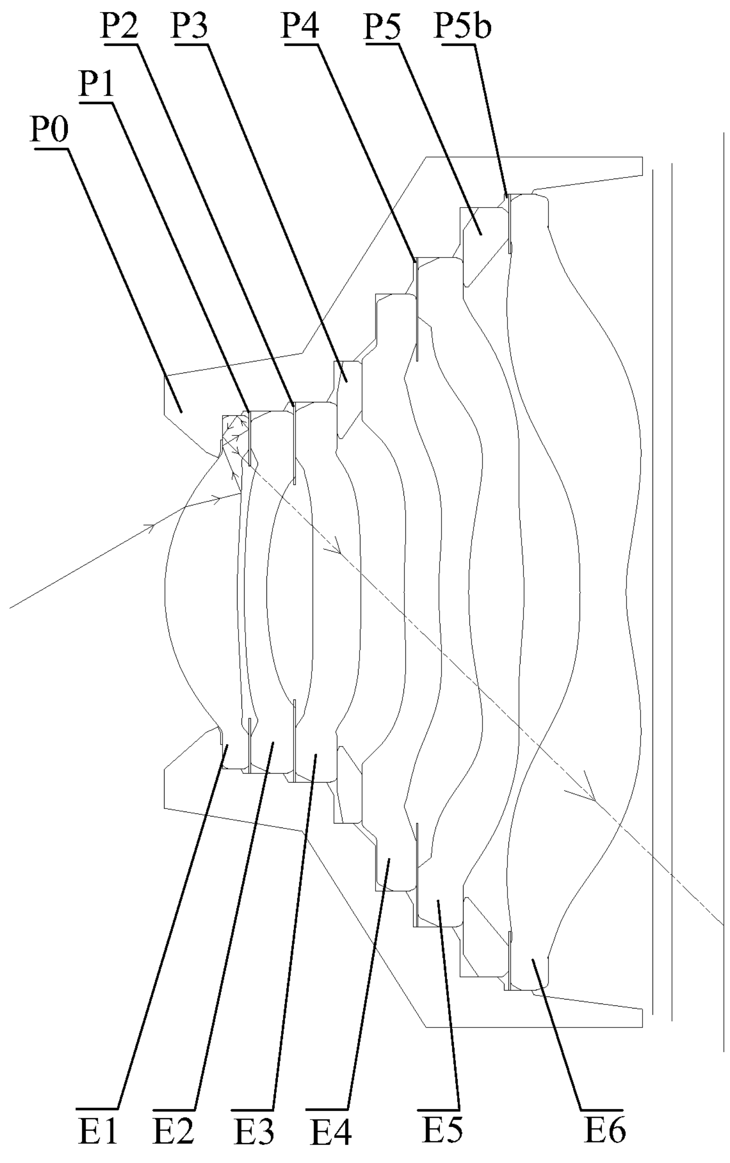
FIG. 2 is a schematic diagram of a situation where light reflected after passing through a first lens is effectively intercepted to reduce stray light, according to an exemplary implementation of the present disclosure.

In the exemplary implementations, the optical imaging system according to the present disclosure may satisfy the conditional expression $1.5<f1/D1m+R1/d1m<3.0$. Here, D1m is an outer diameter of an image-side surface of the first spacing element, d1m is an inner diameter of the image-side surface of the first spacing element, f1 is an effective focal length of the first lens, and R1 is a radius of curvature of an object-side surface of the first lens. By controlling the outer diameter of the image-side surface of the first spacing element, the inner diameter of the image-side surface of the first spacing element, the effective focal length of the first lens and the radius of curvature of the object-side surface of the first lens to satisfy $1.5<f1/D1m+R1/d1m<3.0$, the light can have a large refraction angle when being incident on the object-side surface of the first lens, such that the light is emitted after being reflected from the inside of the first lens. Then, by reasonably controlling the sizes of the outer and inner diameters of the image-side surface of the first spacing element, the emitted light is effectively intercepted, thereby reducing the generation of stray light (see. FIG. 2).

In the exemplary implementations, the optical imaging system according to the present disclosure may satisfy the conditional expression $12.5<f1/EP01+R2/CT1<15.0$. Here, EP01 is a distance from an object-side end surface of the lens barrel (end surface of the lens barrel closest to the object side) to an object-side surface of the first spacing element on the optical axis, CT1 is a center thickness of the first lens on the optical axis, f1 is the effective focal length of the first lens, and R2 is a radius of curvature of the image-side surface of the first lens. By reasonably controlling the effective focal length of the first lens and the spacing distance between the object-side end surface of the lens barrel and the first spacing element, and at the same time, by reasonably controlling the radius of curvature of the image-side surface of the first lens and the center thickness of the first lens, the thickness of the lens barrel on which the first lens bears can be ensured, and the overall structure of the first lens can be ensured, to avoid the increase of difficulty in molding and processing of the first lens due to the small edge thickness of the first lens and the increase of the thickness-thinness ratio that are caused by the too small radius of curvature.

In the exemplary implementations, the optical imaging system according to the present disclosure may satisfy the conditional expression $3.5<T12/CP1+R2/d1s<12.5$. Here, T12 is an air spacing between the first lens and the second lens on the optical axis, CP1 is a maximal thickness of the first spacing element along the direction parallel to the optical axis, R2 is the radius of curvature of the image-side surface of the first lens, and d1s is an inner diameter of the object-side surface of the first spacing element. By controlling the air spacing between the first lens and the second lens and the maximal thickness of the first spacing element, and at the same time, by reasonably controlling the radius of curvature of the image-side surface of the first lens and the inner diameter of the object-side surface of the first spacing element, the positions of the first lens and the second lens can be effectively restricted, and the compactness of the structure of the optical lens assembly can be improved. Moreover, it is conducive to correcting the off-axis aberration to improve the overall imaging quality of the optical lens assembly.

In the exemplary implementations, the optical imaging system according to the present disclosure may satisfy the conditional expression $1.5<EP12\times R3/(CT2\times R4)<3.5$. Here, EP12 is a spacing distance between the first spacing element and the second spacing element along the direction parallel to the optical axis, CT2 is a center thickness of the second lens on the optical axis, R3 is a radius of curvature of an object-side surface of the second lens, and R4 is a radius of curvature of the image-side surface of the second lens. By controlling the spacing distance between the first spacing element and the second spacing element along the direction parallel to the optical axis, the center thickness of the second lens on the optical axis, the radius of curvature of the object-side surface of the second lens and the radius of curvature of the image-side surface of the second lens to satisfy $1.5<EP12\times R3/(CT2\times R4)<3.5$, the overall curvature of the second lens can be ensured, and the thickness-thinness ratio of the second lens can be controlled, thereby meeting the processing and molding requirements of the second lens.

In the exemplary implementations, the optical imaging system according to the present disclosure may satisfy the conditional expression $25.0<|T23/CP2+R5/d2s|<41.0$. Here, T23 is an air spacing between the second lens and the third lens on the optical axis, CP2 is a maximal thickness of the second spacing element along the direction parallel to the optical axis, R5 is a radius of curvature of an object-side surface of the third lens, and d2s is an inner diameter of an object-side surface of the second spacing element. By controlling the air spacing between the second lens and the third lens on the optical axis, the maximal thickness of the second spacing element along the direction parallel to the optical axis, the radius of curvature of the object-side surface of the third lens and the inner diameter of the object-side surface of the second spacing element to satisfy $25.0<|T23/CP2+R5/d2s|<41.0$, the positions of the second lens and the third lens can be effectively restricted, to improve the compactness of the overall optical system. Moreover, it is conducive to correcting the off-axis aberration to improve the overall imaging quality of the entire optical lens assembly.

In the exemplary implementations, the optical imaging system according to the present disclosure may satisfy the conditional expression $0.4<|EP34\times f4/(EP23\times f3)|<1.5$. Here, EP34 is a spacing distance between the third spacing element and the fourth spacing element along the direction parallel to the optical axis, EP23 is a spacing distance between the second spacing element and the third spacing element along the direction parallel to the optical axis, f3 is an effective focal length of the third lens, and f4 is an effective focal length of the fourth lens. By controlling the spacing distance between the third spacing element and the fourth spacing element along the direction parallel to the optical axis, the spacing distance between the second spacing element and the third spacing element along the direction parallel to the optical axis, the effective focal length of the third lens and the effective focal length of the fourth lens to satisfy $0.4<|EP34\times f4/(EP23\times f3)|<1.5$, the spacing distance between the third lens and the fourth lens can be reduced under the condition of satisfying the molding of the third lens and the fourth lens, to avoid the increase in cost of the lens assembly that is caused by the requirement for the addition of one component due to the too large spacing. In addition, the poor assembling stability due to the large segment difference between the third lens and the fourth lens that is caused by the too large spacing can be avoided.

In the exemplary implementations, the optical imaging system according to the present disclosure may satisfy the conditional expression $1.5<CT4/EP45+f5/d4m<2.5$. Here, CT4 is a center thickness of the fourth lens on the optical axis, EP45 is a spacing distance between the fourth spacing element and the fifth spacing element along the direction parallel to the optical axis, f5 is an effective focal length of the fifth lens, and d4m is an inner diameter of an image-side surface of the fourth spacing element. By controlling the center thickness of the fourth lens on the optical axis, the spacing distance between the fourth spacing element and the fifth spacing element along the direction parallel to the optical axis, the effective focal length of the fifth lens and the inner diameter of the image-side surface of the fourth spacing element to satisfy $1.5<CT4/EP45+f5/d4m<2.5$, the thickness-thinness ratio of the fourth lens can be effectively ensured to satisfy the processing and molding conditions of the lens. The overall shape of the fifth lens can be controlled, and the segment difference between the fifth lens and the fourth lens can be controlled, which can avoid the problems of poor assembling stability and impacts on the quality and imaging quality of the lens assembly due to the too large segment difference during the assembling.

In the exemplary implementations, the optical imaging system according to the present disclosure may satisfy the conditional expression $2.0<|R11\times D5m|/(R12\times d5m)<6.5$. Here, R11 is a radius of curvature of an object-side surface of the sixth lens, R12 is a radius of curvature of an image-side surface of the sixth lens, D5m is an outer diameter of the image-side surface of the fifth spacing element, and d5m is the inner diameter of the image-side surface of the fifth spacing element. By reasonably controlling the radius of curvature of the object-side surface of the sixth lens and the radius of curvature of the image-side surface of the sixth lens, and at the same time, by reasonably controlling the outer diameter and inner diameter of the fifth spacing element, the curvature of the sixth lens can be controlled to avoid the problem of difficulty in molding and processing due to the excessive curvature of the sixth lens. Moreover, it is possible to avoid the generation of stray light caused by the direct refraction of the light after the light enters the lens. The light is reflected inside the lens, and the reflected light can hit on the fifth spacing element after being refracted, to reduce the generation of stray light, thereby improving the imaging quality of the lens assembly.

In the exemplary implementations, the optical imaging system according to the present disclosure may satisfy the conditional expression $2.0<EP23/CT3+V3/V2<4.5$. Here, EP23 is the spacing distance between the second spacing element and the third spacing element along the direction parallel to the optical axis, CT3 is a center thickness of the third lens on the optical axis, V3 is an abbe number of the third lens, and V2 is an abbe number of the second lens. By controlling the spacing distance between the second spacing element and the third spacing element along the direction parallel to the optical axis, the center thickness of the third lens on the optical axis, the abbe number of the third lens and the abbe number of the second lens to satisfy $2.0<EP23/CT3+V3/V2<4.5$, the thickness-thinness ratio of the third lens can be effectively ensured to meet the processability and formability. At the same time, the refractive index of the second lens and the refractive index of the third lens can be reduced, to reduce the degree of dispersion of the overall lens assembly, thereby improving the imaging quality of the lens assembly.

In the exemplary implementations, the optical imaging system according to the present disclosure may satisfy the conditional expression $1.5<Fno\times(L/f)<2.0$. Here, Fno is a relative F-number of the optical imaging system, L is a maximal height of the lens barrel along a direction of the optical axis, and f is an effective focal length of the optical imaging system. By controlling the relative F-number of the optical imaging system, the maximal height of the lens barrel along the direction of the optical axis and the effective focal length of the optical imaging system to satisfy $1.5<Fno\times(L/f)<2.0$, the height of the lens barrel can be reduced by adjusting the effective focal length while the lens assembly obtains a larger field-of-view, which makes the lens assembly more superior. Moreover, more images can be captured while the field-of-view is enlarged, thereby improving the richness of the image plane.

In the exemplary implementations, the optical imaging system according to the present disclosure may satisfy the conditional expression $2.5<L/(\tan(Semi\text{-}FOV)\times f)+D5m/D1m<3.5$. Here, L is the maximal height of the lens barrel along the direction of the optical axis, Semi-FOV is half of a maximal field-of-view of the optical imaging system, f is the effective focal length of the optical imaging system, D5m is the outer diameter of the image-side surface of the fifth spacing element, and D1m is the outer diameter of the image-side surface of the first spacing element. By controlling the maximal height of the lens barrel along the direction of the optical axis, the half of the maximal field-of-view of the optical imaging system, the effective focal length of the optical imaging system, the outer diameter of the image-side surface of the fifth spacing element and the outer diameter of the image-side surface of the first spacing element to satisfy $2.5<L/(\tan(Semi\text{-}FOV)\times f)+D5m/D1m<3.5$, the segment difference between the lenses in the lens assembly can be controlled while the lens assembly acquires more images, to avoid that the occurrence of a large segment difference between the lenses affects the assembling stability and finally results in the low overall yield of the lens assembly and a poor imaging quality.

In the exemplary implementations, the optical imaging system according to the present disclosure may include at least one diaphragm. The diaphragm can restrict the optical path and control the light intensity. The diaphragm may be disposed at an appropriate position of the optical imaging system. For example, the diaphragm may be disposed between the object side and the first lens.

In the exemplary implementations, alternatively, the above optical imaging system may further include an optical filter for correcting color deviations and/or a protective glass for protecting a photosensitive element on the image plane.

The optical imaging system according to the above implementations of the present disclosure may include an imaging lens group, at least one spacing element and a lens barrel. Here, the imaging lens group may adopt a six-lens structure as described above, and each lens may be respectively in contact with the inner wall of the lens barrel. The spacing element may be disposed between adjacent lenses and be in contact with the corresponding lens. By reasonably controlling the effective focal length of the sixth lens and the effective focal length of the optical imaging system, the curvature of the sixth lens can be ensured, to avoid the problem of difficulty in molding and processing due to the excessive curvature of the sixth lens. By controlling the air spacing between the fourth lens and the fifth lens on the optical axis and the maximal thickness of the fifth spacing element, the segment difference between the fifth lens and the sixth lens can be controlled to avoid the problem of poor assembling stability due to the too large segment difference between the fifth lens and the sixth lens, which is conducive to improving the yield of the lens assembly.

In the implementations of the present disclosure, at least one of the surfaces of the first lens, the second lens, the third lens, the fourth lens, the fifth lens and the sixth lens may be an aspheric surface, that is, the object-side surface of the first lens to the image-side surface of the sixth lens may include at least one aspheric surface. An aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality. Alternatively, at least one of the object-side surface and image-side surface of each of the first lens, the second lens, the third lens, the fourth lens, the fifth lens and the sixth lens is an aspheric surface. Alternatively, the object-side surface and image-side surface of each of the first lens, the second lens, the third lens, the fourth lens, the fifth lens and the sixth lens are aspheric surfaces.

However, it should be understood by those skilled in the art that the various results and advantages described in the present specification may be obtained by changing the number of the lenses constituting the optical imaging system or changing the number of the spacing elements without departing from the technical solution claimed by the present disclosure. As an example, although the optical imaging system having six lenses is described as an example in the implementations, the optical imaging system is not limited to including the six lenses. If desired, the optical imaging system may also include other numbers of lenses. As another example, although the optical imaging system having the first to fifth spacing elements is described as an example in the implementations, the optical imaging system is not limited to including the first to fifth spacing elements described above. If desired, the optical imaging system may also include other numbers of spacing elements.

Specific embodiments of the optical imaging system that may be applicable to the above implementations are further described below with reference to the accompanying drawings.

Embodiment 1

Figure 3A:
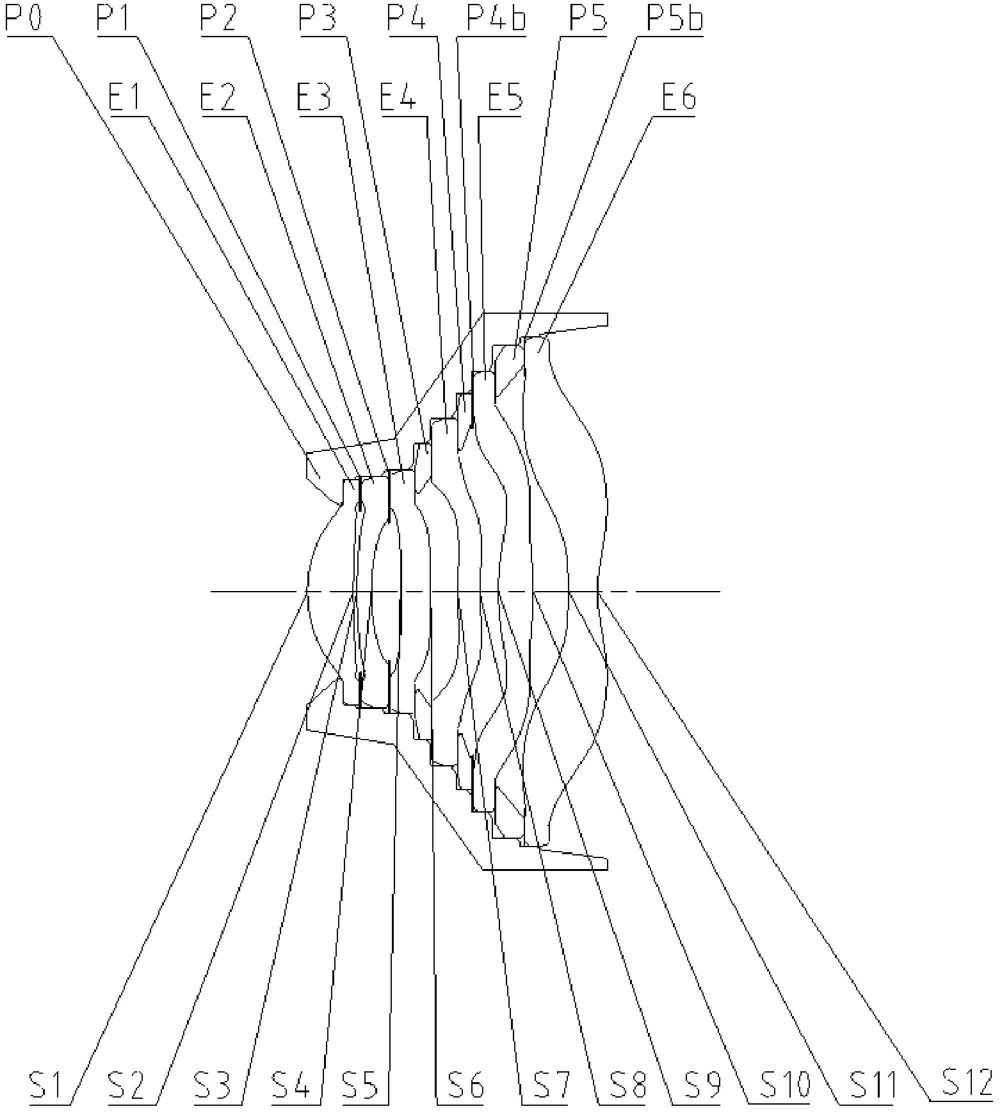
FIGS. 3A and 3B are schematic structural diagrams of an optical imaging system according to Embodiment 1 of the present disclosure in two implementations.
Figure 3B:
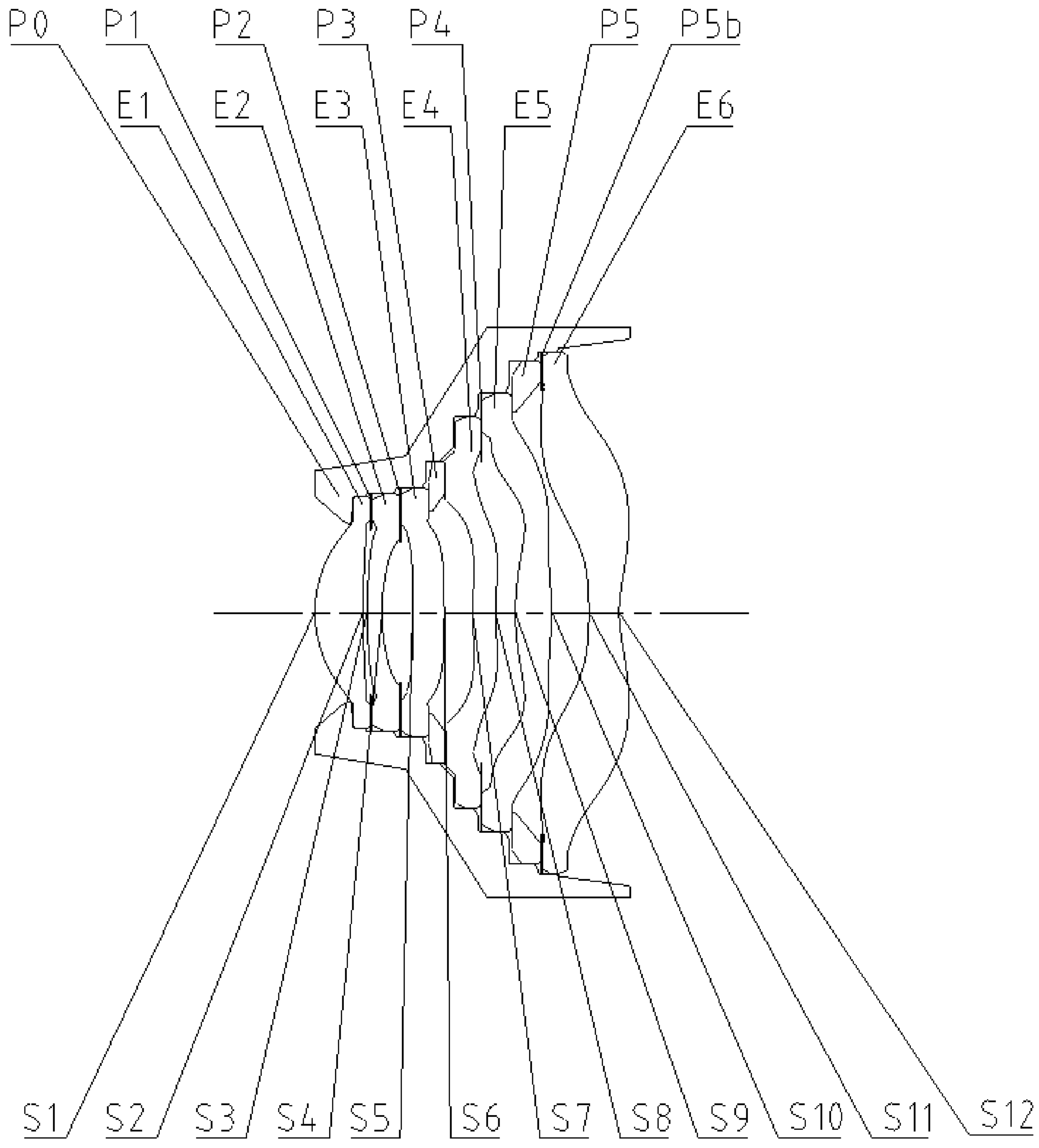

An optical imaging system according to Embodiment 1 of the present disclosure is described below with reference to FIGS. 3A and 3B and FIGS. 4A-4D. FIGS. 3A and 3B are schematic structural diagrams of the optical imaging system according to Embodiment 1 of the present disclosure in two different implementations.

As shown in FIGS. 3A and 3B, the optical imaging system includes a lens barrel P0, and a first lens E1, a second lens E2, a third lens E3, a fourth lens E4, a fifth lens E5 and a sixth lens E6 that are assembled in the lens barrel P0 and arranged in sequence along an optical axis from an object side to an image side.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a convex surface. The sixth lens E6 has a negative refractive power, an object-side surface S11 of the sixth lens E6 is a concave surface, and an image-side surface S12 of the sixth lens E6 is a concave surface. The optical imaging system may further include an optical filter (not shown) and an image plane (not shown). Light from an object, for example, may sequentially pass through the surfaces S1-S12, and finally forms an image on the image plane.

Table 1 shows basic parameters of the optical imaging system in Embodiment 1. Here, the units of a radius of curvature and a thickness/distance are millimeters (mm).

TABLE 1

| | | | | material | | |
|---|---|---|---|---|---|---|
| surface number | surface type | radius of curvature | thickness/distance | refractive index | abbe number | conic coefficient |
| OBJ | spherical | infinite | infinite | | | |
| STO | spherical | infinite | −0.5919 | | | |
| S1 | aspheric | 2.0834 | 0.8062 | 1.55 | 55.9 | −3.6636 |
| S2 | aspheric | 7.6946 | 0.0730 | | | −29.4349 |
| S3 | aspheric | 6.2507 | 0.2508 | 1.67 | 20.4 | −36.6698 |
| S4 | aspheric | 3.6582 | 0.5100 | | | −12.9077 |
| S5 | aspheric | 29.7021 | 0.5329 | 1.55 | 55.9 | −39.8809 |
| S6 | aspheric | −261.3263 | 0.4804 | | | −90.0000 |
| S7 | aspheric | 6.4538 | 0.3852 | 1.57 | 37.4 | −8.5315 |
| S8 | aspheric | 4.2713 | 0.3310 | | | −9.8436 |
| S9 | aspheric | 4.8726 | 0.6150 | 1.55 | 55.9 | −10.0095 |
| S10 | aspheric | −4.1526 | 0.6204 | | | −7.2001 |
| S11 | aspheric | −9.1893 | 0.5101 | 1.54 | 55.7 | −6.0731 |
| S12 | aspheric | 2.2641 | 0.2966 | | | −9.5898 |

In Embodiment 1, the object-side surface and the image-side surface of any lens in the first to sixth lenses E1-E6 are both aspheric surfaces, and the surface type x of each aspheric lens may be defined using, but not limited to, the following formula:

$$x = \frac{ch^2}{1 + \sqrt{1 - (k+1)c^2h^2}} + \sum Aih^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and Ai is the correction coefficient of an i-th order of the aspheric surface. Tables 2-1 and 2-2 below show the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S1-S12 in Embodiment 1.

TABLE 2-1

| surface number | A4 | A6 | A8 | A10 | A12 | A14 | A16 |
|---|---|---|---|---|---|---|---|
| S1 | 2.0054E−01 | −1.0977E−02 | −2.8720E−03 | −1.5142E−03 | −5.1617E−04 | −1.2989E−04 | −4.7045E−05 |
| S2 | −6.2162E−02 | 7.6141E−03 | −5.7660E−03 | 4.6598E−04 | −2.5788E−04 | 3.7617E−05 | 1.8680E−05 |
| S3 | −2.4819E−03 | 2.3564E−02 | −3.5101E−03 | 1.4286E−03 | −2.1495E−04 | 1.1033E−04 | −1.6531E−05 |
| S4 | 8.2917E−02 | 1.1993E−02 | 6.9289E−04 | 6.2805E−04 | 9.6656E−05 | 3.4727E−05 | 3.7254E−06 |
| S5 | −1.1640E−01 | −4.3573E−03 | 1.4679E−03 | 1.7099E−03 | 8.0467E−04 | 3.6390E−04 | 1.1152E−04 |
| S6 | −2.6989E−01 | −1.1905E−02 | 3.0978E−03 | 5.5184E−03 | 2.5702E−03 | 1.6082E−03 | 6.2903E−04 |
| S7 | −6.6639E−01 | 1.0869E−02 | −1.2219E−02 | 6.0804E−03 | 1.8845E−03 | 1.9647E−03 | 1.4289E−03 |
| S8 | −1.0109E+00 | 2.7426E−01 | −4.0366E−02 | −1.0007E−02 | 5.1468E−04 | 3.6149E−03 | −3.8523E−04 |
| S9 | −1.2163E+00 | 1.7369E−01 | 1.3687E−01 | −7.5851E−02 | −4.3642E−03 | 1.1021E−02 | 9.7043E−04 |
| S10 | 3.4560E−01 | −3.6244E−01 | 1.7730E−01 | −5.7395E−02 | 2.5518E−02 | 1.2119E−03 | −5.8218E−03 |
| S11 | −4.5484E−01 | 5.6339E−01 | −3.1710E−01 | 1.4765E−01 | −5.6052E−02 | 8.2971E−03 | 2.7084E−03 |
| S12 | −2.5181E+00 | 6.1196E−01 | −7.2398E−02 | 3.8687E−02 | −3.9333E−02 | 5.9364E−03 | −3.0192E−03 |

TABLE 2-2

| surface number | A18 | A20 | A22 | A24 | A26 | A28 | A30 |
|---|---|---|---|---|---|---|---|
| S1 | 9.1160E−06 | 1.0951E−05 | 0.0000E+00 | 0.0000E+00 | 0.0000E+00 | 0.0000E+00 | 0.0000E+00 |
| S2 | 3.0530E−05 | 1.8512E−05 | 0.0000E+00 | 0.0000E+00 | 0.0000E+00 | 0.0000E+00 | 0.0000E+00 |
| S3 | 6.5433E−05 | −6.4194E−06 | 1.3892E−05 | −1.3613E−05 | 1.3087E−05 | 0.0000E+00 | 0.0000E+00 |
| S4 | 9.8359E−06 | −2.0277E−07 | 1.0306E−05 | −3.9153E−06 | −1.6402E−06 | 0.0000E+00 | 0.0000E+00 |
| S5 | 1.9471E−06 | −2.2768E−05 | −3.1539E−05 | 6.6672E−06 | 8.9124E−06 | 3.8345E−06 | −1.0591E−05 |
| S6 | 3.0096E−04 | 7.3572E−05 | 2.7662E−05 | −2.1747E−05 | −2.0112E−06 | 1.4806E−05 | 2.4818E−06 |
| S7 | 1.6958E−04 | −1.5732E−05 | −3.1038E−04 | −1.4456E−04 | −9.9467E−05 | −3.4133E−05 | −1.5748E−05 |
| S8 | −1.3793E−03 | 2.8052E−04 | 2.0323E−04 | 5.0675E−05 | −1.5395E−04 | −4.2207E−06 | 2.6768E−05 |
| S9 | −3.0384E−03 | 1.0107E−03 | −4.1235E−06 | −1.4037E−04 | −1.2482E−04 | 9.5359E−05 | 4.7880E−06 |
| S10 | −1.0782E−03 | 3.8321E−04 | −1.7474E−04 | 4.9334E−04 | 7.1574E−05 | −7.3872E−06 | −4.1327E−05 |
| S11 | −1.5796E−03 | 1.9493E−04 | 8.2122E−04 | −5.4768E−04 | 2.7212E−04 | 1.0499E−05 | −6.7534E−05 |
| S12 | 3.3495E−03 | −2.1234E−04 | 2.1952E−04 | 3.2842E−04 | 3.4782E−04 | −1.3486E−04 | −2.2772E−04 |

Exemplarily, Embodiment 1-1 is as shown in FIG. 3A. According to Embodiment 1-1, the optical imaging system may further include a plurality of spacing elements accommodated in the lens barrel P0, for example, a first spacing element P1 that is placed between the first lens E1 and the second lens E2 and is in contact with the image-side surface of the first lens E1; a second spacing element P2 that is placed between the second lens E2 and the third lens E3 and is in contact with the image-side surface of the second lens E2; a third spacing element P3 that is placed between the third lens E3 and the fourth lens E4 and is in contact with the image-side surface of the third lens E3; a fourth spacing element P4 that is placed between the fourth lens E4 and the fifth lens E5 and is in contact with the image-side surface of the fourth lens E4, and a spacing element P4*b* that is placed between the fourth spacing element P4 and the fifth lens E5; and a fifth spacing element P5 that is placed between the fifth lens E5 and the sixth lens E6 and is in contact with the image-side surface of the fifth lens E5, and a spacing element P5*b* that is placed between the fifth spacing element P5 and the sixth lens E6.

Exemplarily, Embodiment 1-2 is as shown in FIG. 3B. According to Embodiment 1-2, the optical imaging system may further include a plurality of spacing elements accommodated in the lens barrel P0, for example, a first spacing element P1 that is placed between the first lens E1 and the second lens E2 and is in contact with the image-side surface of the first lens E1; a second spacing element P2 that is placed between the second lens E2 and the third lens E3 and is in contact with the image-side surface of the second lens E2; a third spacing element P3 that is placed between the third lens E3 and the fourth lens E4 and is in contact with the image-side surface of the third lens E3; a fourth spacing element P4 that is placed between the fourth lens E4 and the fifth lens E5 and is in contact with the image-side surface of the fourth lens E4; and a fifth spacing element P5 that is placed between the fifth lens E5 and the sixth lens E6 and is in contact with the image-side surface of the fifth lens E5, and a spacing element P5*b* that is placed between the fifth spacing element P5 and the sixth lens E6.

In Embodiments 1-1 and 1-2, the values of relevant parameters are as shown in Table 9. In combination with FIGS. 3A and 3B and FIG. 1, here, D1m is an outer diameter of the image-side surface of the first spacing element P1; d1m is an inner diameter of the image-side surface of the first spacing element P1; d1s is an inner diameter of the object-side surface of the first spacing element P1; EP01 is a distance from the object-side end surface of the lens barrel P0 to the first spacing element P1 on the optical axis; CP1 is a maximal thickness of the first spacing element P1 along the direction parallel to the optical axis; EP12 is a spacing distance between the first spacing element P1 and the second spacing element P2 along the direction of the optical axis; CP2 is a maximal thickness of the second spacing element P2 along the direction parallel to the optical axis; d2s is an inner diameter of the object-side surface of the second spacing element P2; EP23 is a spacing distance between the second spacing element P2 and the third spacing element P3 along the direction of the optical axis; EP34 is a spacing distance between the third spacing element P3 and the fourth spacing element P4 along the direction of the optical axis; d4m is an inner diameter of the image-side surface of the fourth spacing element P4; EP45 is a spacing distance between the fourth spacing element P4 and the fifth spacing element P5 along the direction of the optical axis; CP5 is a maximal thickness of the fifth spacing element P5 along the direction parallel to the optical axis; D5m is an outer diameter of the image-side surface of the fifth spacing element P5; d5m is an inner diameter of the image-side surface of the fifth spacing element P5; and L is a maximal height of the lens barrel P0 along the direction of the optical axis. The units of the parameters in Table 9 are all millimeters (mm).

FIG. 4A illustrates a longitudinal aberration curve of the optical imaging system in Embodiment 1, representing deviations of focal points of light of different wavelengths converged after passing through a lens assembly. FIG. 4B illustrates an astigmatic curve of the optical imaging system in Embodiment 1, representing a curvature of a tangential image plane and a curvature of a sagittal image plane. FIG. 4C illustrates a distortion curve of the optical imaging system in Embodiment 1, representing amounts of distortion corresponding to different image heights. FIG. 4D illustrates a lateral color curve of the optical imaging system in Embodiment 1, representing deviations of different image heights on the image plane after light passes through the lens assembly. It can be seen from FIGS. 4A-4D that the optical imaging system given in Embodiment 1 can achieve a good imaging quality.

Embodiment 2

Figure 5A:
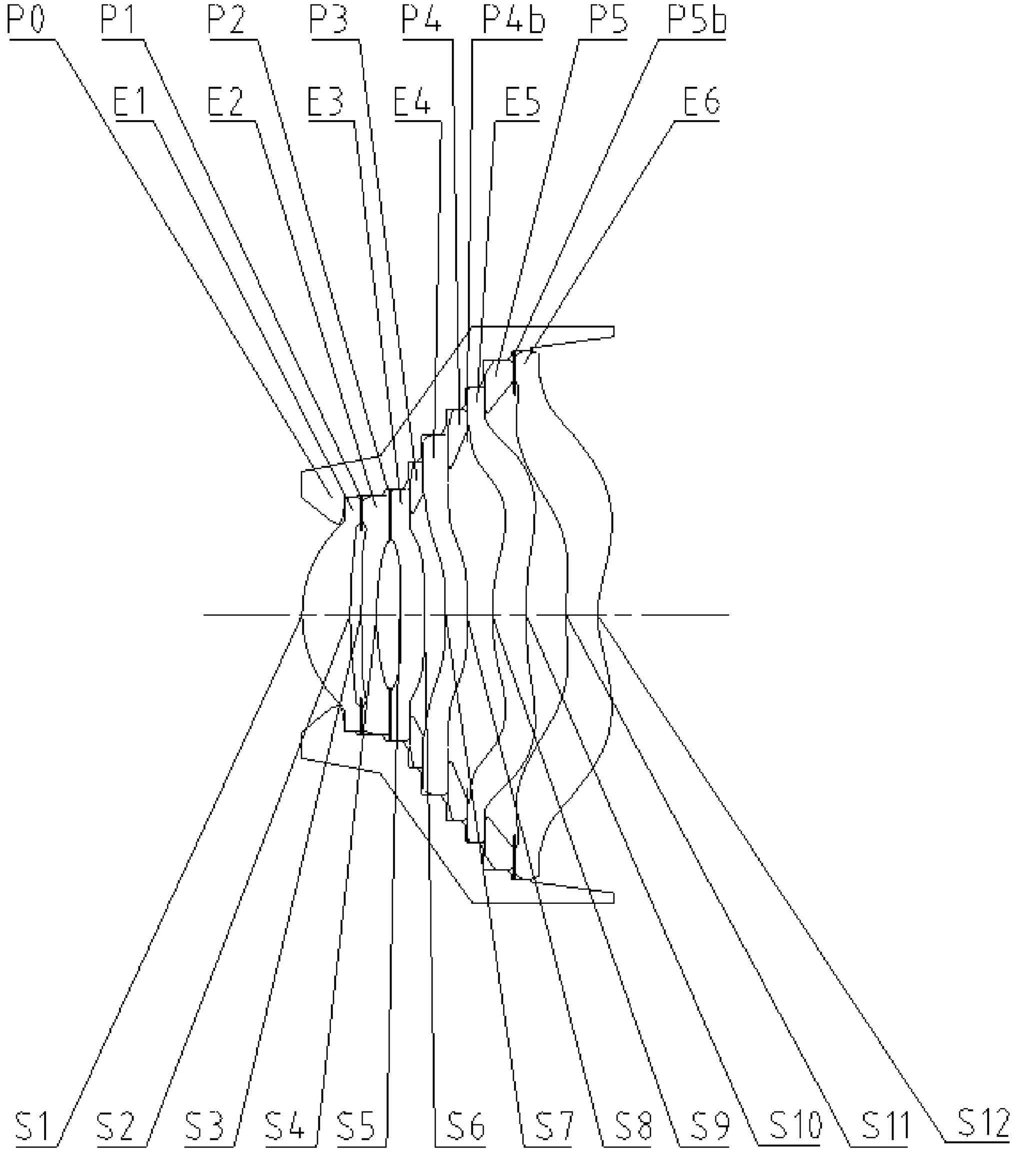
FIGS. 5A and 5B are schematic structural diagrams of an optical imaging system according to Embodiment 2 of the present disclosure in two implementations.
Figure 5B:
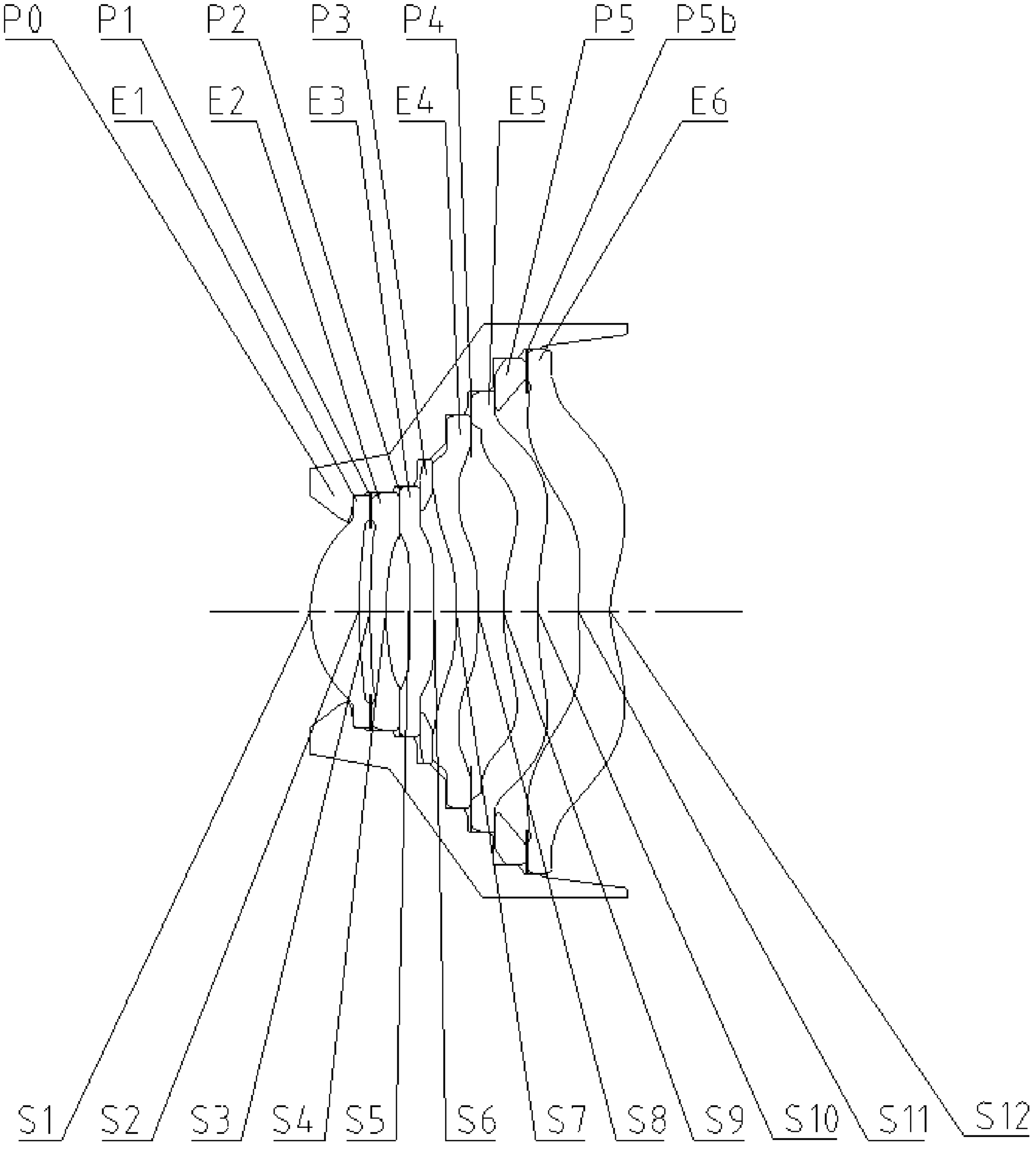

An optical imaging system according to Embodiment 2 of the present disclosure is described below with reference to FIGS. 5A and 5B and FIGS. 6A-6D. In this embodiment and the following embodiment, for the sake of brevity, some descriptions similar to those in Embodiment 1 will be omitted. FIGS. 5A and 5B are schematic structural diagrams of the optical imaging system according to Embodiment 2 of the present disclosure in two different implementations.

As shown in FIGS. 5A and 5B, the optical imaging system includes a lens barrel P0, and a first lens E1, a second lens E2, a third lens E3, a fourth lens E4, a fifth lens E5 and a sixth lens E6 that are assembled in the lens barrel P0 and arranged in sequence along an optical axis from an object side to an image side.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a negative refractive power, an object-side surface S7 of the fourth lens E4 is a concave surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a concave surface. The sixth lens E6 has a negative refractive power, an object-side surface S11 of the sixth lens E6 is a convex surface, and an image-side surface S12 of the sixth lens E6 is a concave surface. The optical imaging system may further include an optical filter (not shown) and an image plane (not shown). Light from an object, for example, may sequentially pass through the surfaces S1-S12, and finally forms an image on the image plane.

Table 3 shows basic parameters of the optical imaging system in Embodiment 2. Here, the units of a radius of curvature and a thickness/distance are millimeters (mm). Tables 4-1 and 4-2 show the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S1-S12 in Embodiment 2. Here, the surface type of each aspheric surface may be defined using the formula (1) given in Embodiment 1.

TABLE 3

| | | | | material | | |
|---|---|---|---|---|---|---|
| surface number | surface type | radius of curvature | thickness/distance | refractive index | abbe number | conic coefficient |
| OBJ | spherical | infinite | infinite | | | |
| STO | spherical | infinite | −0.6301 | | | |
| S1 | aspheric | 2.0311 | 0.8114 | 1.55 | 55.9 | 0.0000 |
| S2 | aspheric | 6.2450 | 0.1893 | | | 0.0000 |
| S3 | aspheric | 7.9111 | 0.2684 | 1.68 | 17.7 | 0.0000 |
| S4 | aspheric | 4.2037 | 0.3883 | | | 0.0000 |
| S5 | aspheric | 14.3276 | 0.4236 | 1.55 | 55.9 | 0.0000 |
| S6 | aspheric | 87.5728 | 0.3644 | | | 0.0000 |
| S7 | aspheric | −17.3571 | 0.3676 | 1.62 | 25.9 | 0.0000 |
| S8 | aspheric | 86.7998 | 0.4228 | | | 0.0000 |
| S9 | aspheric | 2.9355 | 0.5880 | 1.55 | 55.9 | −1.0000 |
| S10 | aspheric | 12.1601 | 0.6759 | | | 0.0000 |
| S11 | aspheric | 3.1430 | 0.5378 | 1.54 | 55.7 | −1.0000 |
| S12 | aspheric | 1.4683 | 0.6109 | | | −1.0000 |

TABLE 4-1

| surface number | A4 | A6 | A8 | A10 | A12 | A14 | A16 |
|---|---|---|---|---|---|---|---|
| S1 | 2.7817E−03 | 1.1946E−03 | −2.5905E−03 | −5.1323E−04 | −6.3197E−04 | 4.9662E−06 | −1.4985E−04 |
| S2 | −6.7329E−02 | 5.5830E−03 | −2.6131E−03 | 6.3843E−06 | −1.9072E−04 | 3.4164E−05 | −4.5432E−05 |
| S3 | −6.4566E−02 | 2.5055E−02 | −2.2698E−03 | 7.8581E−04 | 4.3683E−05 | −1.5243E−05 | 3.4411E−06 |
| S4 | −6.8238E−03 | 1.8293E−02 | −2.8020E−04 | 6.4850E−04 | 2.3328E−04 | 3.9400E−05 | 4.0312E−05 |
| S5 | −1.6163E−01 | −1.5802E−02 | −1.5206E−03 | 3.6582E−04 | 5.4994E−04 | 1.3964E−04 | 1.7341E−04 |
| S6 | −2.6857E−01 | −1.8270E−03 | 6.4074E−03 | 5.6148E−03 | 1.9957E−03 | 1.0250E−03 | 3.0213E−04 |
| S7 | −3.6319E−01 | 1.5256E−01 | −3.6766E−02 | −2.7253E−04 | 4.2293E−03 | 6.0494E−04 | −1.2412E−03 |
| S8 | −5.3863E−01 | 2.7873E−01 | −1.0195E−01 | 7.1298E−03 | 1.0370E−02 | −1.7056E−03 | −2.2590E−03 |
| S9 | −2.2683E+00 | 2.9636E−01 | 1.2590E−01 | −3.4336E−02 | −2.4449E−02 | −3.0866E−03 | 1.2774E−02 |
| S10 | −1.0652E+00 | −1.8124E−01 | 1.4138E−01 | −2.4186E−02 | 2.5689E−02 | −5.4854E−03 | 2.8179E−03 |
| S11 | −4.0644E+00 | 1.4585E+00 | −5.1935E−01 | 1.6020E−01 | −5.2601E−02 | 1.2881E−02 | −9.0616E−03 |
| S12 | −7.5663E+00 | 1.7307E+00 | −3.8897E−01 | 1.7537E−01 | −9.5062E−02 | 2.8658E−02 | −3.0072E−02 |

TABLE 4-2

| surface number | A18 | A20 | A22 | A24 | A26 | A28 | A30 |
|---|---|---|---|---|---|---|---|
| S1 | 4.5297E−05 | −5.0614E−05 | 1.9193E−05 | −2.9659E−05 | 1.7188E−05 | −2.7931E−06 | 3.0106E−07 |
| S2 | 2.7168E−05 | −1.8735E−05 | 1.5006E−05 | −1.6627E−05 | −9.7025E−06 | 3.2131E−06 | −9.2921E−07 |
| S3 | 2.9377E−06 | −3.9139E−06 | 1.8144E−06 | −1.6958E−07 | −9.3881E−06 | −2.5878E−07 | 1.3665E−06 |
| S4 | 9.8005E−06 | 5.1332E−06 | −3.3274E−06 | 4.2066E−06 | −8.5189E−07 | 7.9629E−07 | −1.2581E−07 |
| S5 | 2.9611E−06 | 5.2007E−05 | −6.7184E−06 | 8.4672E−06 | −2.6152E−07 | −8.9321E−07 | 6.6613E−07 |
| S6 | 1.0507E−04 | −2.6813E−05 | −3.0813E−05 | −3.4680E−05 | −1.0341E−05 | −3.8749E−07 | −2.5959E−06 |
| S7 | −7.4260E−05 | 1.9858E−04 | 2.0728E−05 | −7.0887E−07 | 1.1107E−05 | −2.7764E−06 | −4.9275E−06 |
| S8 | 9.4490E−04 | 3.6703E−04 | −3.1985E−04 | −1.8101E−05 | 9.6226E−05 | 1.9699E−05 | −3.5803E−05 |
| S9 | 1.1700E−03 | −3.9663E−03 | −5.6894E−04 | 6.3066E−04 | 3.0645E−04 | −7.2620E−06 | −1.3692E−04 |
| S10 | 1.8329E−03 | −1.6673E−03 | 6.8537E−04 | −6.4983E−04 | −1.1751E−04 | −1.8620E−04 | −1.5364E−04 |
| S11 | 1.0849E−02 | −7.3184E−03 | 2.5747E−03 | 5.1940E−04 | −6.9569E−04 | 1.2601E−04 | −3.7195E−07 |
| S12 | 1.2345E−02 | 4.3798E−05 | 4.9806E−03 | −2.1637E−03 | −5.4498E−04 | −5.1536E−04 | 3.5635E−04 |

Exemplarily, Embodiment 2-1 is as shown in FIG. 5A. According to Embodiment 2-1, the optical imaging system may further include a plurality of spacing elements accommodated in the lens barrel P0, for example, a first spacing element P1 that is placed between the first lens E1 and the second lens E2 and is in contact with the image-side surface of the first lens E1; a second spacing element P2 that is placed between the second lens E2 and the third lens E3 and is in contact with the image-side surface of the second lens E2; a third spacing element P3 that is placed between the third lens E3 and the fourth lens E4 and is in contact with the image-side surface of the third lens E3; a fourth spacing element P4 that is placed between the fourth lens E4 and the fifth lens E5 and is in contact with the image-side surface of the fourth lens E4, and a spacing element P4*b* that is placed between the fourth spacing element P4 and the fifth lens E5; and a fifth spacing element P5 that is placed between the fifth lens E5 and the sixth lens E6 and is in contact with the image-side surface of the fifth lens E5, and a spacing element P5*b* that is placed between the fifth spacing element P5 and the sixth lens E6.

Exemplarily, Embodiment 2-2 is as shown in FIG. 5B. According to Embodiment 2-2, the optical imaging system may further include a plurality of spacing elements accommodated in the lens barrel P0, for example, a first spacing element P1 that is placed between the first lens E1 and the second lens E2 and is in contact with the image-side surface of the first lens E1; a second spacing element P2 that is placed between the second lens E2 and the third lens E3 and is in contact with the image-side surface of the second lens E2; a third spacing element P3 that is placed between the third lens E3 and the fourth lens E4 and is in contact with the image-side surface of the third lens E3; a fourth spacing element P4 that is placed between the fourth lens E4 and the fifth lens E5 and is in contact with the image-side surface of the fourth lens E4; and a fifth spacing element P5 that is placed between the fifth lens E5 and the sixth lens E6 and is in contact with the image-side surface of the fifth lens E5, and a spacing element P5*b* that is placed between the fifth spacing element P5 and the sixth lens E6.

In Embodiments 2-1 and 2-2, the values of relevant parameters are as shown in Table 9. Here, the meanings of the parameters are as above, and thus will not be repeatedly described here. The units of the parameters shown in Table 9 are all millimeters (mm).

FIG. 6A illustrates a longitudinal aberration curve of the optical imaging system in Embodiment 2, representing deviations of focal points of light of different wavelengths converged after passing through a lens assembly. FIG. 6B illustrates an astigmatic curve of the optical imaging system in Embodiment 2, representing a curvature of a tangential image plane and a curvature of a sagittal image plane. FIG. 6C illustrates a distortion curve of the optical imaging system in Embodiment 2, representing amounts of distortion corresponding to different image heights. FIG. 6D illustrates a lateral color curve of the optical imaging system in Embodiment 2, representing deviations of different image heights on the image plane after light passes through the lens assembly. It can be seen from FIGS. 6A-6D that the optical imaging system given in Embodiment 2 can achieve a good imaging quality.

Embodiment 3

Figure 7A:
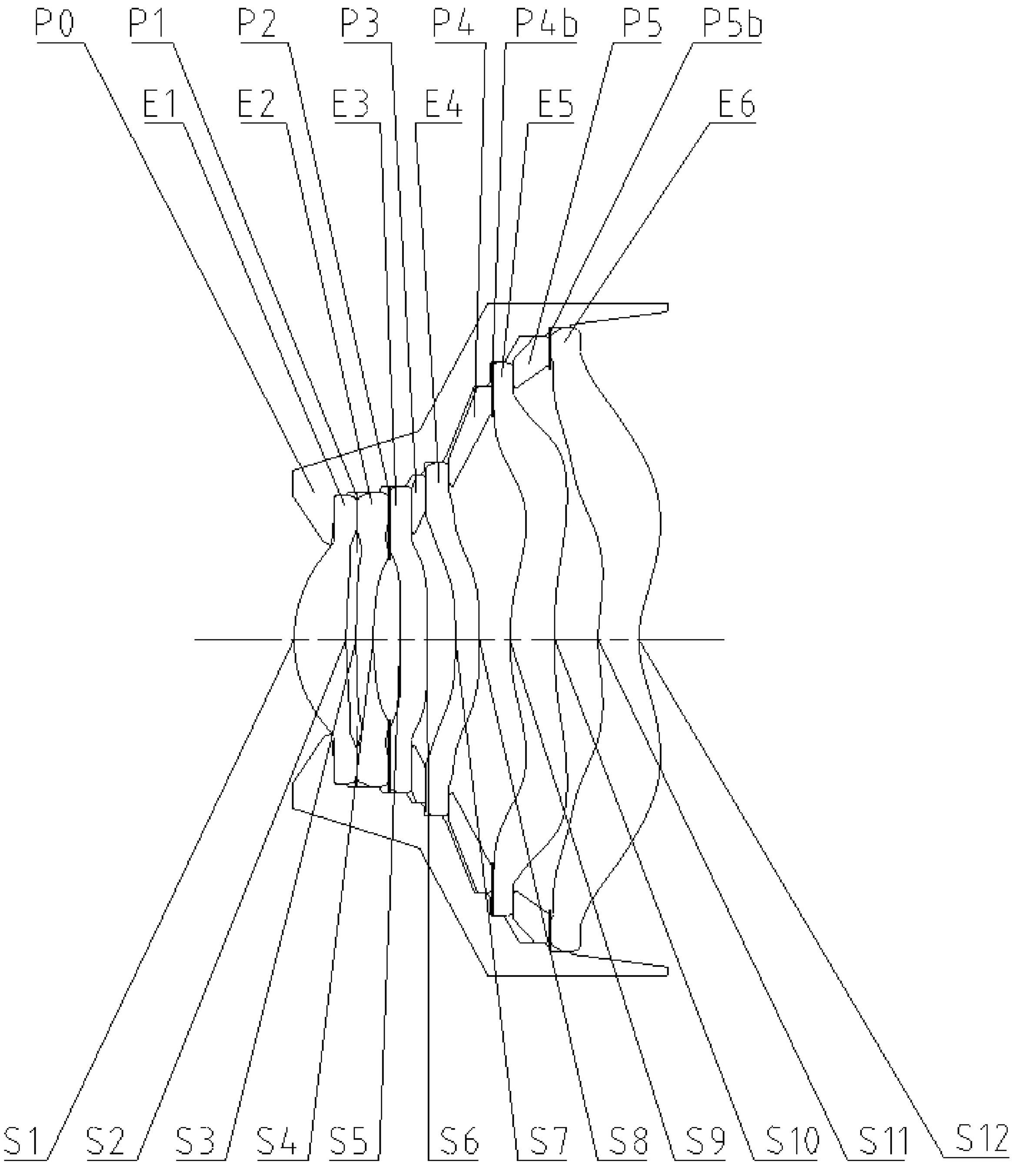
FIGS. 7A and 7B are schematic structural diagrams of an optical imaging system according to Embodiment 3 of the present disclosure in two implementations.
Figure 7B:
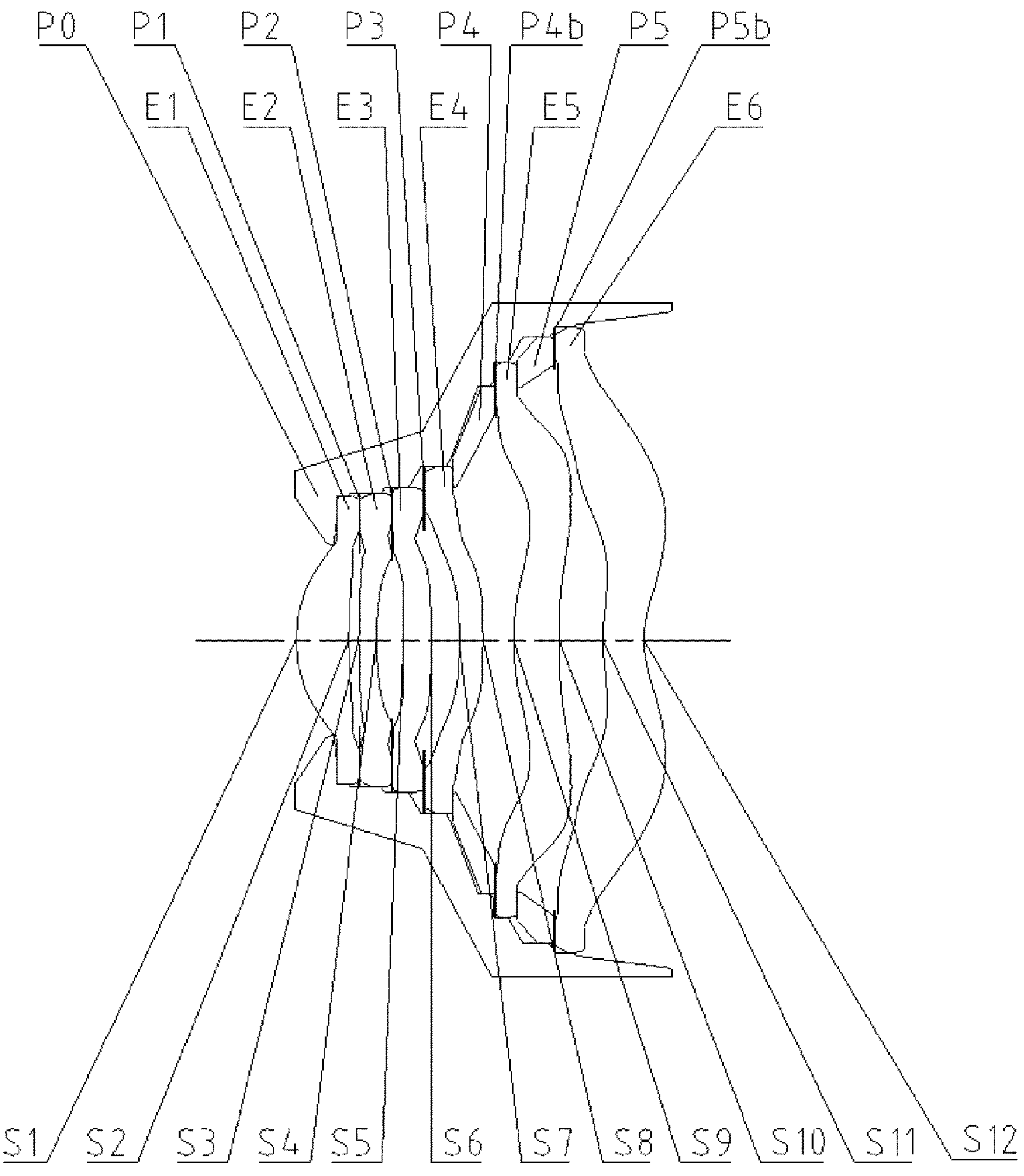

An optical imaging system according to Embodiment 3 of the present disclosure is described below with reference to FIGS. 7A and 7B and FIGS. 8A-8D. FIGS. 7A and 7B are schematic structural diagrams of the optical imaging system according to Embodiment 3 of the present disclosure in two different implementations.

As shown in FIGS. 7A and 7B, the optical imaging system includes a lens barrel P0, and a first lens E1, a second lens E2, a third lens E3, a fourth lens E4, a fifth lens E5 and a sixth lens E6 that are assembled in the lens barrel P0 and arranged in sequence along an optical axis from an object side to an image side.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a negative refractive power, an object-side surface S7 of the fourth lens E4 is a concave surface, and an image-side surface S8 of the fourth lens E4 is a convex surface. The fifth lens E5 has a positive refractive power, an object-side surface S9 of the fifth lens E5 is a convex surface, and an image-side surface S10 of the fifth lens E5 is a concave surface. The sixth lens E6 has a negative refractive power, an object-side surface S11 of the sixth lens E6 is a convex surface, and an image-side surface S12 of the sixth lens E6 is a concave surface. The optical imaging system may further include an optical filter (not shown) and an image plane (not shown). Light from an object, for example, may sequentially pass through the surfaces S1-S12, and finally forms an image on the image plane.

Table 5 shows basic parameters of the optical imaging system in Embodiment 3. Here, the units of a radius of curvature and a thickness/distance are millimeters (mm). Tables 6-1 and 6-2 show the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S1-S12 in Embodiment 3. Here, the surface type of each aspheric surface may be defined using the formula (1) given in Embodiment 1.

TABLE 5

| | | | | material | | |
|---|---|---|---|---|---|---|
| surface number | surface type | radius of curvature | thickness/distance | refractive index | abbe number | conic coefficient |
| OBJ | spherical | infinite | infinite | | | |
| STO | spherical | infinite | −0.6217 | | | |
| S1 | aspheric | 2.2676 | 0.8795 | 1.55 | 55.9 | 0.0015 |
| S2 | aspheric | 7.0728 | 0.1681 | | | 0.0513 |
| S3 | aspheric | 9.0349 | 0.2900 | 1.68 | 19.2 | −0.1311 |
| S4 | aspheric | 4.6906 | 0.4616 | | | 0.2183 |
| S5 | aspheric | 22.4873 | 0.4605 | 1.55 | 55.9 | −10.3567 |
| S6 | aspheric | 184.6419 | 0.4689 | | | −67.0518 |
| S7 | aspheric | −14.6003 | 0.3988 | 1.62 | 25.9 | 1.1293 |
| S8 | aspheric | −51.9347 | 0.5186 | | | 16.4531 |
| S9 | aspheric | 4.2511 | 0.7612 | 1.55 | 55.9 | −0.0123 |
| S10 | aspheric | 24.9942 | 0.7331 | | | 9.6585 |
| S11 | aspheric | 3.0213 | 0.6863 | 1.54 | 55.7 | −0.9738 |
| S12 | aspheric | 1.6110 | 0.7110 | | | −1.0028 |

TABLE 6-1

| surface number | A4 | A6 | A8 | A10 | A12 | A14 | A16 |
|---|---|---|---|---|---|---|---|
| S1 | −1.8730E−02 | −4.8510E−03 | −5.0213E−03 | −6.3149E−04 | −7.3670E−04 | 1.3064E−04 | −1.6934E−04 |
| S2 | −9.9510E−02 | 5.1797E−03 | −3.4519E−03 | −1.6559E−05 | −1.4606E−04 | 1.5128E−05 | −2.7549E−05 |
| S3 | −5.4349E−02 | 2.9769E−02 | −2.8374E−03 | 9.1676E−04 | −2.1446E−05 | −1.9791E−05 | 3.3590E−06 |
| S4 | 1.1149E−02 | 2.6049E−02 | −8.9583E−04 | 1.3169E−03 | −4.4798E−05 | 1.5577E−04 | −7.0215E−05 |
| S5 | −1.7854E−01 | −6.6955E−03 | −1.0978E−03 | 9.3320E−04 | 3.4042E−04 | 2.3997E−04 | 9.3089E−05 |
| S6 | −2.8554E−01 | 7.8209E−03 | 5.5641E−03 | 3.3974E−03 | 1.1263E−03 | 4.9797E−04 | 1.7277E−04 |
| S7 | −4.3295E−01 | 1.3319E−01 | −2.6248E−02 | −1.0399E−02 | 4.5949E−03 | 1.2831E−03 | −2.2585E−04 |
| S8 | −6.0996E−01 | 2.6630E−01 | −8.2361E−02 | −1.0789E−02 | 1.3972E−02 | −5.5958E−04 | −2.2646E−03 |
| S9 | −2.9567E+00 | 2.8752E−01 | 9.6069E−02 | −8.6394E−02 | 5.3518E−03 | −2.2342E−04 | 8.0304E−03 |
| S10 | −8.8413E−01 | −3.4938E−01 | 1.9378E−01 | −4.2369E−03 | 4.5866E−02 | −3.7690E−02 | −2.5246E−03 |
| S11 | −5.7095E+00 | 1.7349E+00 | −6.6220E−01 | 3.1054E−01 | −1.2922E−01 | 1.4628E−02 | 1.3275E−02 |
| S12 | −1.0217E+01 | 2.3464E+00 | −6.3637E−01 | 2.5771E−01 | −1.1395E−01 | 5.1284E−02 | −3.7197E−02 |

TABLE 6-2

| surface number | A18 | A20 | A22 | A24 | A26 | A28 | A30 |
|---|---|---|---|---|---|---|---|
| S1 | 1.0754E−04 | −6.1174E−05 | 5.0224E−05 | −3.3430E−05 | 2.1783E−05 | −1.6836E−05 | 2.4062E−06 |
| S2 | 2.0343E−05 | −1.9112E−06 | 7.2129E−06 | −2.4353E−06 | −3.4736E−06 | −6.0085E−06 | 1.2978E−06 |

TABLE 6-2-continued

| surface number | A18 | A20 | A22 | A24 | A26 | A28 | A30 |
|---|---|---|---|---|---|---|---|
| S3 | 5.2153E−06 | 8.6752E−07 | −3.3152E−06 | 3.7071E−06 | 3.5749E−06 | −5.0462E−06 | −6.4285E−07 |
| S4 | 6.3066E−05 | −2.8836E−05 | 2.2420E−05 | −1.4238E−05 | 1.6003E−05 | −5.7303E−06 | −5.5172E−07 |
| S5 | 7.4901E−05 | 6.2812E−06 | 2.3191E−05 | −1.2366E−05 | 4.0568E−06 | −7.8981E−06 | 1.7281E−06 |
| S6 | −2.5910E−06 | −5.1103E−05 | −2.8599E−05 | −1.6073E−05 | −1.2748E−05 | −3.0824E−06 | −4.7462E−06 |
| S7 | −5.4619E−04 | 1.5038E−04 | −5.6830E−05 | −2.9774E−05 | −9.6988E−06 | 5.7050E−05 | −1.3951E−06 |
| S8 | −2.5034E−04 | 7.3182E−04 | −1.4727E−04 | −1.1205E−04 | 6.4439E−05 | 3.6287E−05 | −3.2919E−05 |
| S9 | −7.7334E−03 | 1.0140E−03 | 1.3897E−03 | −6.1403E−04 | 2.6748E−05 | 9.1287E−05 | −1.4046E−05 |
| S10 | −1.3619E−03 | −7.8626E−04 | 7.3595E−04 | −1.6573E−03 | 1.4173E−03 | 7.4414E−05 | 3.2615E−04 |
| S11 | 3.8114E−03 | −1.4155E−02 | 8.5469E−03 | −1.3105E−03 | −6.6433E−04 | 2.6711E−04 | 6.7091E−05 |
| S12 | 1.8157E−02 | −4.9601E−03 | 4.4181E−03 | −3.8327E−03 | 6.5451E−04 | −7.5508E−04 | 4.5161E−04 |

Exemplarily, Embodiments 3-1 and 3-2 are respectively as shown in FIGS. 7A and 7B. According to Embodiments 3-1 and 3-2, the optical imaging system may further include a plurality of spacing elements accommodated in the lens barrel P0, for example, a first spacing element P1 that is placed between the first lens E1 and the second lens E2 and is in contact with the image-side surface of the first lens E1; a second spacing element P2 that is placed between the second lens E2 and the third lens E3 and is in contact with the image-side surface of the second lens E2; a third spacing element P3 that is placed between the third lens E3 and the fourth lens E4 and is in contact with the image-side surface of the third lens E3; a fourth spacing element P4 that is placed between the fourth lens E4 and the fifth lens E5 and is in contact with the image-side surface of the fourth lens E4, and a spacing element P4*b* that is placed between the fourth spacing element P4 and the fifth lens E5; and a fifth spacing element P5 that is placed between the fifth lens E5 and the sixth lens E6 and is in contact with the image-side surface of the fifth lens E5, and a spacing element P5*b* that is placed between the fifth spacing element P5 and the sixth lens E6.

In Embodiments 3-1 and 3-2, the values of relevant parameters are as shown in Table 9. Here, the meanings of the parameters are as above, and thus will not be repeatedly described here. The units of the parameters shown in Table 9 are all millimeters (mm).

FIG. 8A illustrates a longitudinal aberration curve of the optical imaging system in Embodiment 3, representing deviations of focal points of light of different wavelengths converged after passing through a lens assembly. FIG. 8B illustrates an astigmatic curve of the optical imaging system in Embodiment 3, representing a curvature of a tangential image plane and a curvature of a sagittal image plane. FIG. 8C illustrates a distortion curve of the optical imaging system in Embodiment 3, representing amounts of distortion corresponding to different image heights. FIG. 8D illustrates a lateral color curve of the optical imaging system in Embodiment 3, representing deviations of different image heights on the image plane after light passes through the lens assembly. It can be seen from FIGS. 8A-8D that the optical imaging system given in Embodiment 3 can achieve a good imaging quality.

Embodiment 4

Figure 9A:
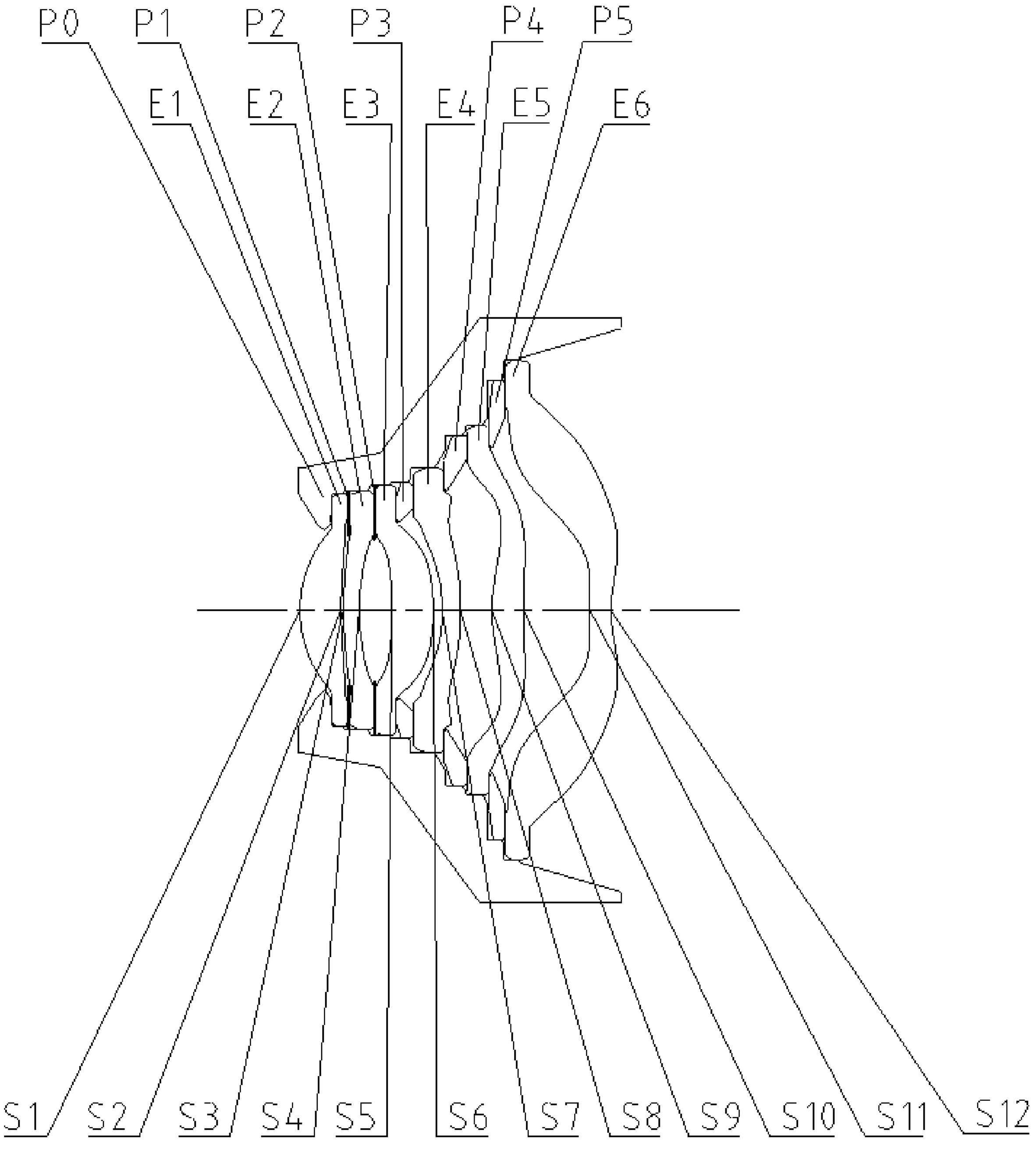
FIGS. 9A and 9B are schematic structural diagrams of an optical imaging system according to Embodiment 4 of the present disclosure in two implementations.
Figure 9B:
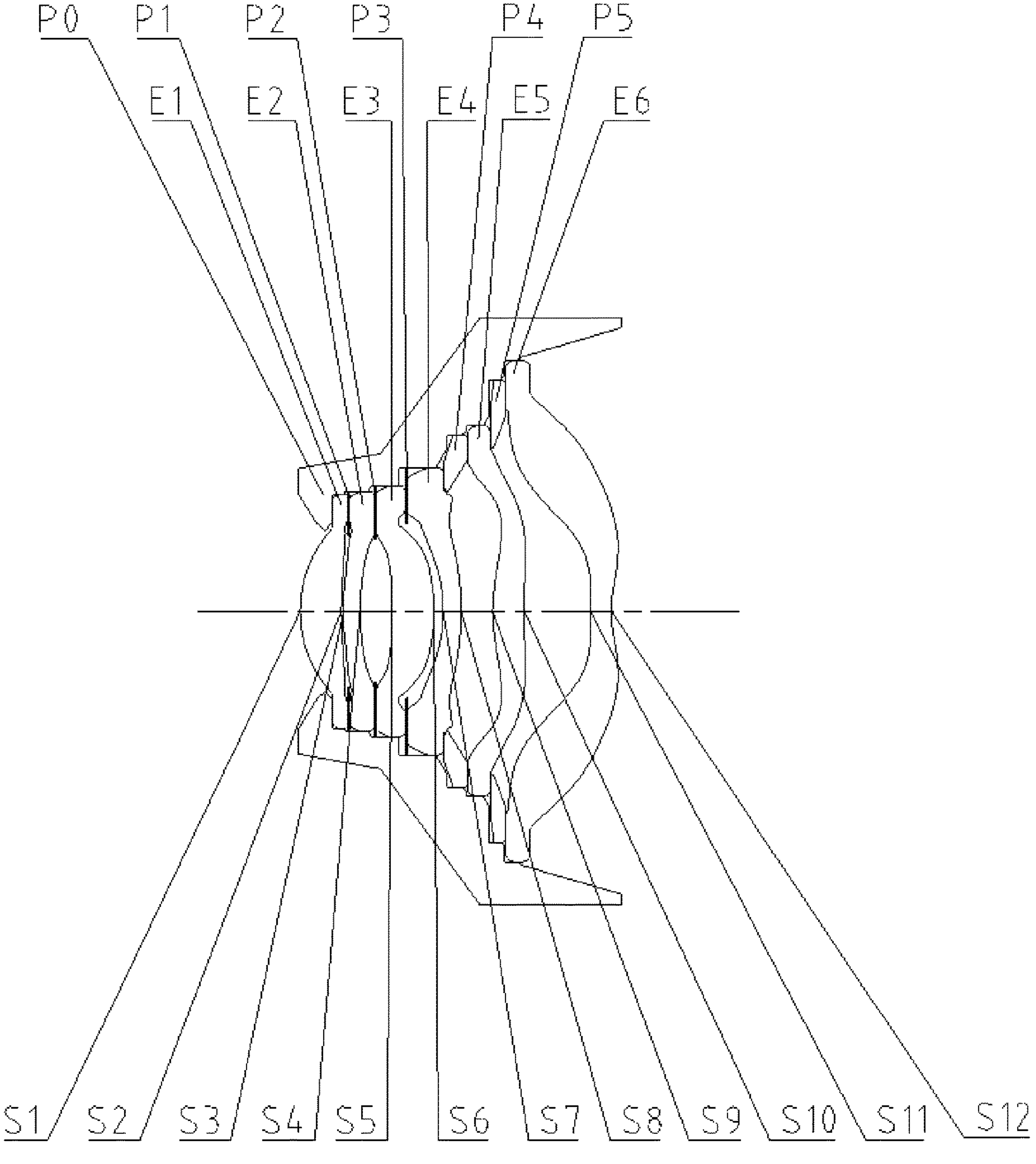

An optical imaging system according to Embodiment 4 of the present disclosure is described below with reference to FIGS. 9A and 9B. FIGS. 9A and 9B are schematic structural diagrams of the optical imaging system according to Embodiment 4 of the present disclosure in two different implementations.

As shown in FIGS. 9A and 9B, the optical imaging system includes a lens barrel P0, and a first lens E1, a second lens E2, a third lens E3, a fourth lens E4, a fifth lens E5 and a sixth lens E6 that are assembled in the lens barrel P0 and arranged in sequence along an optical axis from an object side to an image side.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a concave surface, and an image-side surface S6 of the third lens E3 is a convex surface. The fourth lens E4 has a negative refractive power, an object-side surface S7 of the fourth lens E4 is a concave surface, and an image-side surface S8 of the fourth lens E4 is a convex surface. The fifth lens E5 has a positive refractive power, an object-side surface S9 of the fifth lens E5 is a convex surface, and an image-side surface S10 of the fifth lens E5 is a concave surface. The sixth lens E6 has a negative refractive power, an object-side surface S11 of the sixth lens E6 is a convex surface, and an image-side surface S12 of the sixth lens E6 is a concave surface. The optical imaging system may further include an optical filter (not shown) and an image plane (not shown). Light from an object, for example, may sequentially pass through the surfaces S1-S12, and finally forms an image on the image plane.

Table 7 shows basic parameters of the optical imaging system in Embodiment 4. Here, the units of a radius of curvature and a thickness/distance are millimeters (mm). Tables 8-1 and 8-2 show the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S1-S12 in Embodiment 4. Here, the surface type of each aspheric surface may be defined using the formula (1) given in Embodiment 1.

TABLE 7

| surface number | surface type | radius of curvature | thickness/distance | material: refractive index | material: abbe number | conic coefficient |
|---|---|---|---|---|---|---|
| OBJ | spherical | infinite | infinite | | | |
| STO | spherical | infinite | −0.4079 | | | |
| S1 | aspheric | 2.1194 | 0.6761 | 1.54 | 56.1 | 0.0000 |
| S2 | aspheric | 4.3313 | 0.0384 | | | 0.0000 |
| S3 | aspheric | 3.5845 | 0.2686 | 1.67 | 19.2 | 0.0000 |
| S4 | aspheric | 3.6897 | 0.5370 | | | 0.0000 |
| S5 | aspheric | −10.0710 | 0.6909 | 1.57 | 37.3 | 0.0000 |
| S6 | aspheric | −3.7330 | 0.1478 | | | 0.0000 |
| S7 | aspheric | −3.2443 | 0.3000 | 1.66 | 20.4 | 0.0000 |
| S8 | aspheric | −9.1883 | 0.5224 | | | 0.0000 |
| S9 | aspheric | 2.8856 | 0.5260 | 1.54 | 56.1 | 0.0000 |
| S10 | aspheric | 15.0851 | 1.0968 | | | 0.0000 |
| S11 | aspheric | 9.6376 | 0.3456 | 1.54 | 56.1 | 0.0000 |
| S12 | aspheric | 1.8472 | 0.5993 | | | −0.9154 |

TABLE 8-1

| surface number | A4 | A6 | A8 | A10 | A12 | A14 | A16 |
|---|---|---|---|---|---|---|---|
| S1 | −1.0030E−03 | 3.4767E−02 | −1.5038E−01 | 3.8996E−01 | −5.7200E−01 | 3.8331E−01 | 1.3119E−01 |
| S2 | −1.4242E−01 | 2.9992E−01 | −1.2742E+00 | 4.8090E+00 | −1.2103E+01 | 2.0432E+01 | −2.3592E+01 |
| S3 | −1.3484E−01 | 1.5487E−01 | −5.0851E−01 | 2.2233E+00 | −6.2995E+00 | 1.1660E+01 | −1.4608E+01 |
| S4 | −1.5562E−02 | −1.1833E−01 | 9.0804E−01 | −3.9122E+00 | 1.1461E+01 | −2.3299E+01 | 3.3088E+01 |
| S5 | −2.7259E−02 | 2.7679E−02 | −3.3936E−01 | 1.5503E+00 | −4.4857E+00 | 8.6347E+00 | −1.1369E+01 |
| S6 | −3.1282E−02 | −5.0840E−02 | 9.8283E−02 | −1.0877E−01 | 7.7768E−02 | −4.6075E−02 | 6.3063E−03 |
| S7 | −5.7097E−02 | −8.2617E−02 | 4.5279E−01 | −1.1006E+00 | 1.9631E+00 | −2.5392E+00 | 2.2880E+00 |
| S8 | −8.4149E−02 | 5.9402E−03 | 1.0940E−01 | −1.7377E−01 | 1.7549E−01 | −1.3172E−01 | 7.3719E−02 |
| S9 | −3.6307E−02 | −4.3723E−02 | 6.3519E−02 | −5.4458E−02 | 3.2310E−02 | −1.3614E−02 | 4.0604E−03 |
| S10 | 2.0101E−02 | −6.1724E−02 | 5.6045E−02 | −3.6495E−02 | 1.7307E−02 | −5.8326E−03 | 1.3700E−03 |
| S11 | −1.9144E−01 | 5.7011E−02 | −9.8947E−03 | 8.9172E−04 | 1.8447E−04 | −9.8770E−05 | 2.0764E−05 |
| S12 | −2.0342E−01 | 9.2936E−02 | −3.6885E−02 | 1.1696E−02 | −2.7706E−03 | 4.7830E−04 | −5.9591E−05 |

TABLE 8-2

| surface number | A18 | A20 | A22 | A24 | A26 | A28 | A30 |
|---|---|---|---|---|---|---|---|
| S1 | −4.9329E−01 | 4.4128E−01 | −2.0390E−01 | 4.9601E−02 | −5.0358E−03 | 0.0000E+00 | 0.0000E+00 |
| S2 | 1.8684E+01 | −9.9736E+00 | 3.4265E+00 | −6.8342E−01 | 6.0063E−02 | 0.0000E+00 | 0.0000E+00 |
| S3 | 1.2495E+01 | −7.1850E+00 | 2.6531E+00 | −5.6751E−01 | 5.3375E−02 | 0.0000E+00 | 0.0000E+00 |
| S4 | −3.2673E+01 | 2.1963E+01 | −9.5753E+00 | 2.4388E+00 | −2.7517E−01 | 0.0000E+00 | 0.0000E+00 |
| S5 | 1.0260E+01 | −6.2209E+00 | 2.4038E+00 | −5.2284E−01 | 4.2848E−02 | 2.0011E−03 | 0.0000E+00 |
| S6 | 2.0489E−02 | −1.3174E−02 | −1.6212E−03 | 4.1944E−03 | −1.4896E−03 | 1.7458E−04 | 0.0000E+00 |
| S7 | −1.4067E+00 | 5.7847E−01 | −1.5261E−01 | 2.3430E−02 | −1.5967E−03 | 0.0000E+00 | 0.0000E+00 |
| S8 | −2.9615E−02 | 8.1354E−03 | −1.4285E−03 | 1.4049E−04 | −5.1008E−06 | −1.1760E−07 | 0.0000E+00 |
| S9 | −8.4879E−04 | 1.2145E−04 | −1.1302E−05 | 6.1428E−07 | −1.4752E−08 | 0.0000E+00 | 0.0000E+00 |
| S10 | −2.2065E−04 | 2.3793E−05 | −1.6395E−06 | 6.5237E−08 | −1.1407E−09 | 0.0000E+00 | 0.0000E+00 |
| S11 | −2.5854E−06 | 2.0356E−07 | −9.9908E−09 | 2.8001E−10 | −3.4302E−12 | 0.0000E+00 | 0.0000E+00 |
| S12 | 5.2874E−06 | −3.2539E−07 | 1.3189E−08 | −3.1642E−10 | 3.4012E−12 | 0.0000E+00 | 0.0000E+00 |

Exemplarily, Embodiments 4-1 and 4-2 are respectively as shown in FIGS. 9A and 9B. According to Embodiments 4-1 and 4-2, the optical imaging system may further include a plurality of spacing elements accommodated in the lens barrel P0, for example, a first spacing element P1 that is placed between the first lens E1 and the second lens E2 and is in contact with the image-side surface of the first lens E1; a second spacing element P2 that is placed between the second lens E2 and the third lens E3 and is in contact with the image-side surface of the second lens E2; a third spacing element P3 that is placed between the third lens E3 and the fourth lens E4 and is in contact with the image-side surface of the third lens E3; a fourth spacing element P4 that is placed between the fourth lens E4 and the fifth lens E5 and is in contact with the image-side surface of the fourth lens E4; and a fifth spacing element P5 that is placed between the fifth lens E5 and the sixth lens E6 and is in contact with the image-side surface of the fifth lens E5.

In Embodiments 4-1 and 4-2, the values of relevant parameters are as shown in Table 9. Here, the meanings of the parameters are as above, and thus will not be repeatedly described here. The units of the parameters shown in Table 9 are all millimeters (mm).

TABLE 9

| parameter | embodiment 1-1 | 1-2 | 2-1 | 2-2 | 3-1 | 3-2 | 4-1 | 4-2 |
|---|---|---|---|---|---|---|---|---|
| D1m (mm) | 4.000 | 4.000 | 4.000 | 4.000 | 5.000 | 5.000 | 4.000 | 4.000 |
| d1m (mm) | 2.783 | 2.783 | 2.759 | 2.759 | 2.956 | 2.956 | 2.516 | 2.516 |
| d1s (mm) | 2.783 | 2.783 | 2.759 | 2.759 | 2.956 | 2.956 | 2.516 | 2.516 |
| EP01 (mm) | 0.939 | 0.939 | 1.023 | 1.023 | 1.079 | 1.079 | 0.816 | 0.816 |
| CP1 (mm) | 0.019 | 0.019 | 0.019 | 0.019 | 0.019 | 0.019 | 0.019 | 0.019 |
| EP12 (mm) | 0.478 | 0.478 | 0.463 | 0.463 | 0.518 | 0.518 | 0.418 | 0.418 |
| CP2 (mm) | 0.018 | 0.018 | 0.018 | 0.018 | 0.018 | 0.018 | 0.018 | 0.018 |
| d2s (mm) | 2.380 | 2.380 | 2.450 | 2.450 | 2.705 | 2.705 | 2.373 | 2.373 |
| EP23 (mm) | 0.462 | 0.462 | 0.336 | 0.336 | 0.372 | 0.514 | 0.355 | 0.504 |
| EP34 (mm) | 0.467 | 0.599 | 0.436 | 0.635 | 0.392 | 0.478 | 0.497 | 0.617 |
| d4m (mm) | 5.893 | 5.112 | 6.118 | 5.198 | 7.714 | 7.714 | 5.094 | 5.094 |
| EP45 (mm) | 0.394 | 0.518 | 0.305 | 0.423 | 0.371 | 0.366 | 0.367 | 0.367 |
| CP5 (mm) | 0.508 | 0.508 | 0.508 | 0.508 | 0.618 | 0.618 | 0.264 | 0.264 |
| D5m (mm) | 8.380 | 8.380 | 8.380 | 8.380 | 10.180 | 10.180 | 7.625 | 7.625 |
| d5m (mm) | 7.824 | 7.824 | 7.824 | 7.824 | 9.339 | 9.339 | 6.557 | 6.557 |
| L (mm) | 5.300 | 5.300 | 5.350 | 5.350 | 6.330 | 6.330 | 5.350 | 5.350 |

In addition, in Embodiments 1-4, the effective focal length f of the optical imaging system, the effective focal length values f1-f6 of the lenses and the relative F-number Fno of the optical imaging system are as shown in Table 10.

TABLE 10

| parameter | embodiment 1 | 2 | 3 | 4 |
|---|---|---|---|---|
| f (mm) | 5.25 | 5.29 | 6.12 | 5.47 |
| f1 (mm) | 4.98 | 5.17 | 5.75 | 6.86 |
| f3 (mm) | 48.91 | 31.33 | 46.88 | 10.00 |
| f4 (mm) | −23.68 | −23.34 | −32.95 | −7.68 |
| f5 (mm) | 4.21 | 6.94 | 9.27 | 6.44 |
| f6 (mm) | −3.33 | −5.78 | −7.75 | −4.25 |
| Fno | 1.76 | 1.76 | 1.91 | 2.04 |
| FOV (°) | 86.3 | 85.8 | 86.9 | 84.7 |

Embodiments 1-4 respectively satisfy the conditions shown in Table 11.

TABLE 11

| conditional expression | embodiment 1-1 | 1-2 | 2-1 | 2-2 | 3-1 | 3-2 | 4-1 | 4-2 |
|---|---|---|---|---|---|---|---|---|
| f1/D1m + R1/d1m | 1.99 | 1.99 | 2.03 | 2.03 | 1.92 | 1.92 | 2.56 | 2.56 |
| f1/EP01 + R2/CT1 | 14.85 | 14.85 | 12.74 | 12.74 | 13.37 | 13.37 | 14.82 | 14.82 |
| T12/CP1 + R2/d1s | 6.61 | 6.61 | 12.23 | 12.23 | 11.24 | 11.24 | 3.74 | 3.74 |
| EP12 × R3/(CT2 × R4) | 3.26 | 3.26 | 3.25 | 3.25 | 3.44 | 3.44 | 1.51 | 1.51 |
| \|T23/CP2 + R5/d2s\| | 40.82 | 40.82 | 27.42 | 27.42 | 33.96 | 33.96 | 25.59 | 25.59 |
| \|EP34 × f4/(EP23 × f3)\| | 0.49 | 0.63 | 0.97 | 1.41 | 0.74 | 0.65 | 1.08 | 0.94 |
| CT4/EP45 + f5/d4m | 1.69 | 1.57 | 2.34 | 2.20 | 2.28 | 2.29 | 2.08 | 2.08 |
| CP5/T45 + \|f6/d5m\| | 1.96 | 1.96 | 1.94 | 1.94 | 2.02 | 2.02 | 1.15 | 1.15 |
| \|R11 × D5m\|/(R12 × d5m) | 4.35 | 4.35 | 2.29 | 2.29 | 2.04 | 2.04 | 6.07 | 6.07 |
| EP23/CT3 + V3/V2 | 3.61 | 3.61 | 3.95 | 3.95 | 3.72 | 4.03 | 2.46 | 2.67 |
| Fno × (L/f) | 1.78 | 1.78 | 1.79 | 1.79 | 1.98 | 1.98 | 1.99 | 1.99 |
| L/(tan(Semi-FOV) × f) + D5m/D1m | 3.17 | 3.17 | 3.18 | 3.18 | 3.13 | 3.13 | 2.98 | 2.98 |

The present disclosure further provides an imaging apparatus provided with an electronic photosensitive element to form images, and the electronic photosensitive element may be a photosensitive charge coupled device (CCD) or complementary metal oxide semiconductor element (CMOS). The imaging apparatus may be an independent imaging device such as a digital camera, or may be an imaging module integrated in a mobile electronic device such as a mobile phone. The imaging apparatus is equipped with the optical imaging system described above.

The foregoing is only a description for the preferred embodiments of the present disclosure and the applied technical principles. It should be appreciated by those skilled in the art that the scope of protection of the present disclosure is not limited to the technical solution formed by the particular combination of the above technical features. The scope should also cover other technical solutions formed by any combination of the above technical features or equivalent features thereof without departing from the concept of the present disclosure, for example, technical solutions formed by replacing the features disclosed in the present disclosure with (but not limited to) technical features with similar functions.

What is claimed is:

1. An optical imaging system, comprising: a lens barrel, and a lens group and at least one spacing element accommodated in the lens barrel, wherein the lens group comprises a first lens, a second lens, a third lens, a fourth lens, a fifth lens and a sixth lens that are arranged in sequence along an optical axis from an object side to an image side, wherein the sixth lens has a negative refractive power;

the at least one spacing element comprises a fourth spacing element that is located between the fourth lens and the fifth lens and is in contact with an image-side surface of the fourth lens, and a fifth spacing element that is located between the fifth lens and the sixth lens and is in contact with an image-side surface of the fifth lens; and the optical imaging system satisfies:

$$1.0 < CP5/T45 + |f6/d5m| < 2.5, \text{ and}$$

$$1.5 < CT4/EP45 + f5/d4m < 2.5,$$

wherein CP5 is a maximal thickness of the fifth spacing element along a direction parallel to the optical axis, T45 is an air spacing between the fourth lens and the fifth lens on the optical axis, EP45 is a spacing distance between the fourth spacing element and the fifth spacing element along the direction parallel to the optical axis, CT4 is a center thickness of the fourth lens on the optical axis, f5 is an effective focal length of the fifth lens, f6 is an effective focal length of the sixth lens, d4m is an inner diameter of an image-side surface of the fourth spacing element, and d5m is an inner diameter of an image-side surface of the fifth spacing element.

2. The optical imaging system according to claim 1, wherein the at least one spacing element further comprises a first spacing element that is located between the first lens and the second lens and is in contact with an image-side surface of the first lens, and an outer diameter D1m of an image-side surface of the first spacing element, an inner diameter dim of the image-side surface of the first spacing element, an effective focal length f1 of the first lens and a radius of curvature R1 of an object-side surface of the first lens satisfy:

$$1.5 < f1/D1m + R1/d1m < 3.0.$$

3. The optical imaging system according to claim 1, wherein the at least one spacing element further comprises a first spacing element that is located between the first lens and the second lens and is in contact with an image-side surface of the first lens, and a distance EP01 from an object-side end surface of the lens barrel to an object-side surface of the first spacing element along the direction parallel to the optical axis, a center thickness CT1 of the first lens on the optical axis, an effective focal length f1 of the first lens and a radius of curvature R2 of the image-side surface of the first lens satisfy:

$$12.5 < f1/EP01 + R2/CT1 < 15.0.$$

4. The optical imaging system according to claim 1, wherein the at least one spacing element further comprises a first spacing element that is located between the first lens and the second lens and is in contact with an image-side surface of the first lens, and an air spacing T12 between the first lens and the second lens on the optical axis, a maximal thickness CP1 of the first spacing element along the direction parallel to the optical axis, a radius of curvature R2 of the image-side surface of the first lens and an inner diameter d1s of an object-side surface of the first spacing element satisfy:

$$3.5 < T12/CP1 + R2/d1s < 12.5.$$

5. The optical imaging system according to claim 1, wherein the at least one spacing element further comprises a first spacing element that is located between the first lens and the second lens and is in contact with an image-side surface of the first lens, and a second spacing element that is located between the second lens and the third lens and is in contact with an image-side surface of the second lens, and a spacing distance EP12 between the first spacing element and the second spacing element along the direction parallel to the optical axis, a center thickness CT2 of the second lens on the optical axis, a radius of curvature R3 of an object-side surface of the second lens and a radius of curvature R4 of the image-side surface of the second lens satisfy:

$$1.5 < EP12 \times R3/(CT2 \times R4) < 3.5.$$

6. The optical imaging system according to claim 1, wherein the at least one spacing element further comprises a second spacing element that is located between the second lens and the third lens and is in contact with an image-side surface of the second lens, and an air spacing T23 between the second lens and the third lens on the optical axis, a maximal thickness CP2 of the second spacing element along the direction parallel to the optical axis, a radius of curvature R5 of an object-side surface of the third lens and an inner diameter d2s of an object-side surface of the second spacing element satisfy:

$$25.0 < |T23/CP2 + R5/d2s| < 41.0.$$

7. The optical imaging system according to claim 1, wherein the at least one spacing element further comprises a second spacing element that is located between the second lens and the third lens and is in contact with an image-side surface of the second lens, a third spacing element that is located between the third lens and the fourth lens and is in contact with an image-side surface of the third lens, and a fourth spacing element that is located between the fourth lens and the fifth lens and is in contact with an image-side surface of the fourth lens, and a spacing distance EP34 between the third spacing element and the fourth spacing element along the direction parallel to the optical axis, a spacing distance EP23 between the second spacing element and the third spacing element along the direction parallel to the optical axis, an effective focal length f3 of the third lens and an effective focal length f4 of the fourth lens satisfy:

$$0.4 < |EP34 \times f4/(EP23 \times f3)| < 1.5.$$

8. The optical imaging system according to claim 1, wherein the at least one spacing element further comprises a second spacing element that is located between the second lens and the third lens and is in contact with an image-side surface of the second lens, and a third spacing element that is located between the third lens and the fourth lens and is in contact with an image-side surface of the third lens, and a spacing distance EP23 between the second spacing element and the third spacing element along the direction parallel to the optical axis, a center thickness CT3 of the third lens on the optical axis, an abbe number V3 of the third lens and an abbe number V2 of the second lens satisfy:

$$2.0 < EP23/CT3 + V3/V2 < 4.5.$$

9. The optical imaging system according to claim 1, wherein a relative F-number Fno of the optical imaging system, a maximal height of the lens barrel along a direction of the optical axis and an effective focal length f of the optical imaging system satisfy:

$$1.5 < Fno \times (L/f) < 2.0.$$

10. The optical imaging system according to claim 1, wherein the at least one spacing element further comprises a first spacing element that is located between the first lens and the second lens and is in contact with an image-side surface of the first lens, and L is a maximal height of the lens barrel along a direction of the optical axis, half of a maximal field-of-view Semi-FOV of the optical imaging system, an effective focal length f of the optical imaging system, an outer diameter D5m of the image-side surface of the fifth spacing element, and an outer diameter D1m of an image-side surface of the first spacing element satisfy:

$$2.5 < L/(\tan(\text{Semi}-FOV) \times f) + D5m/D1m < 3.5.$$

11. An optical imaging system, comprising: a lens barrel, and a lens group and at least one spacing element accommodated in the lens barrel, wherein the lens group comprises a first lens, a second lens, a third lens, a fourth lens, a fifth lens and a sixth lens that are arranged in sequence along an optical axis from an object side to an image side, wherein the sixth lens has a negative refractive power;

the at least one spacing element comprises a fifth spacing element that is located between the fifth lens and the sixth lens and is in contact with an image-side surface of the fifth lens; and the optical imaging system satisfies:

$$1.0 < CP5/T45 + |f6/d5m| < 2.5, \text{ and}$$

$$2.0 < |R11 \times D5m|/(R12 \times d5m) < 6.5,$$

wherein CP5 is a maximal thickness of the fifth spacing element along a direction parallel to the optical axis, T45 is an air spacing between the fourth lens and the fifth lens on the optical axis, f6 is an effective focal length of the sixth lens, d5m is an inner diameter of an image-side surface of the fifth spacing element, R11 is a radius of curvature of an object-side surface of the sixth lens, R12 is a radius of curvature of an image-side surface of the sixth lens, D5m is an outer diameter of the image-side surface of the fifth spacing element, and d5m is the inner diameter of the image-side surface of the fifth spacing element.

* * * * *